(12) United States Patent
Onggosanusi et al.

(10) Patent No.: US 10,298,307 B2
(45) Date of Patent: May 21, 2019

(54) METHOD AND APPARATUS FOR CHANNEL STATE INFORMATION REFERENCE SIGNAL (CSI-RS)

(71) Applicant: Samsung Electronics Co., Ltd, Suwon-si (KR)

(72) Inventors: Eko Onggosanusi, Coppell, TX (US); Hongbo Si, Plano, TX (US); Thomas David Novlan, Dallas, TX (US); Hoondong Noh, Suwon-Si (KR); Youngwoo Kwak, Suwon-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/996,004

(22) Filed: Jun. 1, 2018

(65) Prior Publication Data
US 2018/0278317 A1 Sep. 27, 2018

Related U.S. Application Data

(63) Continuation of application No. 15/365,909, filed on Nov. 30, 2016, now Pat. No. 9,991,942.
(Continued)

(51) Int. Cl.
*H04B 7/06* (2006.01)
*H04L 5/00* (2006.01)
(Continued)

(52) U.S. Cl.
CPC ......... *H04B 7/0626* (2013.01); *H04B 7/0632* (2013.01); *H04L 5/0048* (2013.01); *H04W 72/0406* (2013.01); *H04B 7/0413* (2013.01); *H04L 5/0057* (2013.01); *H04W 24/10* (2013.01); *H04W 48/12* (2013.01)

(58) Field of Classification Search
CPC . H04W 24/10; H04W 24/08; H04W 72/0446; H04W 72/08; H04W 74/006; H04W 48/12; H04W 48/16; H04W 72/042; H04W 72/0406; H04L 5/0057; H04L 1/0026; H04L 5/0053; H04L 5/001; H04L 5/0048; H04L 5/0035; H04L 5/0032; H04L 1/0027; H04L 25/0202; H04L 5/0051; H04B 17/318; H04B 7/0632; H04B 7/0626

See application file for complete search history.

(56) References Cited

U.S. PATENT DOCUMENTS 9,496,997 B2 * 11/2016 Park .................. H04B 7/024
9,844,045 B2 * 12/2017 Park .................. H04L 5/0091
(Continued)

*Primary Examiner* — Olumide Ajibade Akonai

(57) ABSTRACT

Methods and apparatuses for CSI reporting mechanisms are provided. A user equipment (UE) includes a transceiver and a processor operably connected to the transceiver. The transceiver is configured to receive information indicating a channel state information reference signal (CSI-RS) resource configuration, uplink-related downlink control information (DCI), and a CSI-RS associated with a selected CSI-RS resource in a same subframe as the uplink-related DCI. The processor configured to determine, in response to a CSI request included in the uplink-related DCI, an aperiodic CSI in reference to the CSI-RS. The transceiver is further configured to report the aperiodic CSI by transmitting the aperiodic CSI on an uplink channel.

15 Claims, 11 Drawing Sheets

Related U.S. Application Data

(60) Provisional application No. 62/273,391, filed on Dec. 30, 2015, provisional application No. 62/319,653, filed on Apr. 7, 2016, provisional application No. 62/324,558, filed on Apr. 19, 2016, provisional application No. 62/340,148, filed on May 23, 2016, provisional application No. 62/356,799, filed on Jun. 30, 2016, provisional application No. 62/372,196, filed on Aug. 8, 2016, provisional application No. 62/378,272, filed on Aug. 23, 2016, provisional application No. 62/406,443, filed on Oct. 11, 2016.

(51) Int. Cl.
*H04W 72/04* (2009.01)
*H04B 7/0413* (2017.01)
*H04W 24/10* (2009.01)
*H04W 48/12* (2009.01)

(56) References Cited

U.S. PATENT DOCUMENTS

| | | | |
|---|---|---|---|
| 9,991,942 B2* | 6/2018 | Onggosanusi | H04B 7/0626 |
| 2014/0029458 A1* | 1/2014 | Ye | H04W 24/10 370/252 |
| 2014/0086174 A1* | 3/2014 | Nam | H04L 1/0003 370/329 |
| 2015/0009898 A1* | 1/2015 | Rosa | H04L 5/0048 370/328 |
| 2015/0049625 A1* | 2/2015 | Kim | H04L 1/0026 370/252 |
| 2015/0249973 A1* | 9/2015 | Park | H04L 5/001 370/329 |
| 2015/0256313 A1* | 9/2015 | Kim | H04W 24/10 370/329 |
| 2016/0227519 A1* | 8/2016 | Nimbalker | H04L 5/0094 |

\* cited by examiner

METHOD AND APPARATUS FOR CHANNEL STATE INFORMATION REFERENCE SIGNAL (CSI-RS)

PRIORITY

This application is a continuation of U.S. patent application Ser. No. 15/365,909, filed Nov. 30, 2016, which claims priority under 35 U.S.C. § 119(e) to:

U.S. Provisional Patent Application Ser. No. 62/273,391 filed Dec. 30, 2015;

U.S. Provisional Patent Application Ser. No. 62/319,653 filed Apr. 7, 2016;

U.S. Provisional Patent Application Ser. No. 62/324,558 filed Apr. 19, 2016;

U.S. Provisional Patent Application Ser. No. 62/340,148 filed May 23, 2016;

U.S. Provisional Patent Application Ser. No. 62/356,799 filed Jun. 30, 2016;

U.S. Provisional Patent Application Ser. No. 62/372,196 filed Aug. 8, 2016;

U.S. Provisional Patent Application Ser. No. 62/378,272 filed Aug. 23, 2016; and U.S. Provisional Patent Application Ser. No. 62/406,443 filed Oct. 11, 2016.

The above-identified provisional patent applications are hereby incorporated by reference in their entirety.

TECHNICAL FIELD

The present disclosure relates generally to transmission method and channel state information (CSI) reporting for multiple transmit antennas which includes two dimensional arrays. Such two dimensional arrays can be associated with a type of multiple-input multiple-output (MIMO) system often termed "full-dimension" MIMO (FD-MIMO) or massive MIMO or 3D-MIMO.

BACKGROUND

Wireless communication has been one of the most successful innovations in modern history. The demand of wireless data traffic is rapidly increasing due to the growing popularity among consumers and businesses of smart phones and other mobile data devices, such as tablets, "note pad" computers, net books, eBook readers, and machine type of devices. To meet the high growth in mobile data traffic and support new applications and deployments, improvements in radio interface efficiency and coverage is of paramount importance.

A mobile device or user equipment can measure the quality of the downlink channel and report this quality to a base station so that a determination can be made regarding whether or not various parameters should be adjusted during communication with the mobile device. Existing channel quality reporting processes in wireless communications systems do not sufficiently accommodate reporting of channel state information associated with large, two dimensional array transmit antennas or, in general, antenna array geometry which accommodates a large number of antenna elements.

A transmission time interval for downlink (DL) channels is referred to as a subframe and can have, for example, duration of 1 millisecond.

SUMMARY

Various embodiments of the present disclosure provide methods and apparatuses for CSI reporting.

In one embodiment, a user equipment (UE) is provided. The UE includes a transceiver and a processor operably connected to the transceiver. The transceiver is configured to receive information indicating a channel state information reference signal (CSI-RS) resource configuration, uplink-related downlink control information (DCI), and a CSI-RS associated with a selected CSI-RS resource in a same subframe as the uplink-related DCI. The processor is configured to determine, in response to a CSI request included in the uplink-related DCI, an aperiodic CSI in reference to the CSI-RS. The transceiver is further configured to report the aperiodic CSI by transmitting the aperiodic CSI on an uplink channel.

In another embodiment, a base station (BS) is provided. The BS includes a processor and a transceiver operably connected to the processor. The processor is configured to generate configuration information to configure a user equipment (UE) with channel state information reference signal (CSI-RS) resource. The transceiver configured to transmit, to the UE, the CSI-RS resource configuration information, uplink-related downlink control information (DCI), and a CSI-RS associated with a selected CSI-RS resource in a same subframe as the uplink-related DCI. The transceiver is further configured to receive, from the UE, an aperiodic CSI reporting on an uplink channel. The aperiodic CSI reporting is determined in response to a CSI request included in the uplink-related DCI and in reference to the CSI-RS.

In another embodiment, a method for operating a UE is provided. The method includes receiving, by the UE, information indicating a channel state information reference signal (CSI-RS) resource configuration, an uplink-related downlink control information (DCI), and a CSI-RS associated with a selected CSI-RS resource in a same subframe as the uplink-related DCI; in response to receipt of a CSI request included in the uplink-related DCI, determining, by the UE, an aperiodic CSI in reference to the CSI-RS; and reporting the aperiodic CSI by transmitting the aperiodic CSI on an uplink channel.

The present disclosure relates to a pre-5th-Generation (5G) or 5G communication system to be provided for supporting higher data rates Beyond 4th-Generation (4G) communication system such as Long Term Evolution (LTE).

Other technical features may be readily apparent to one skilled in the art from the following figures, descriptions, and claims.

Before undertaking the DETAILED DESCRIPTION below, it can be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
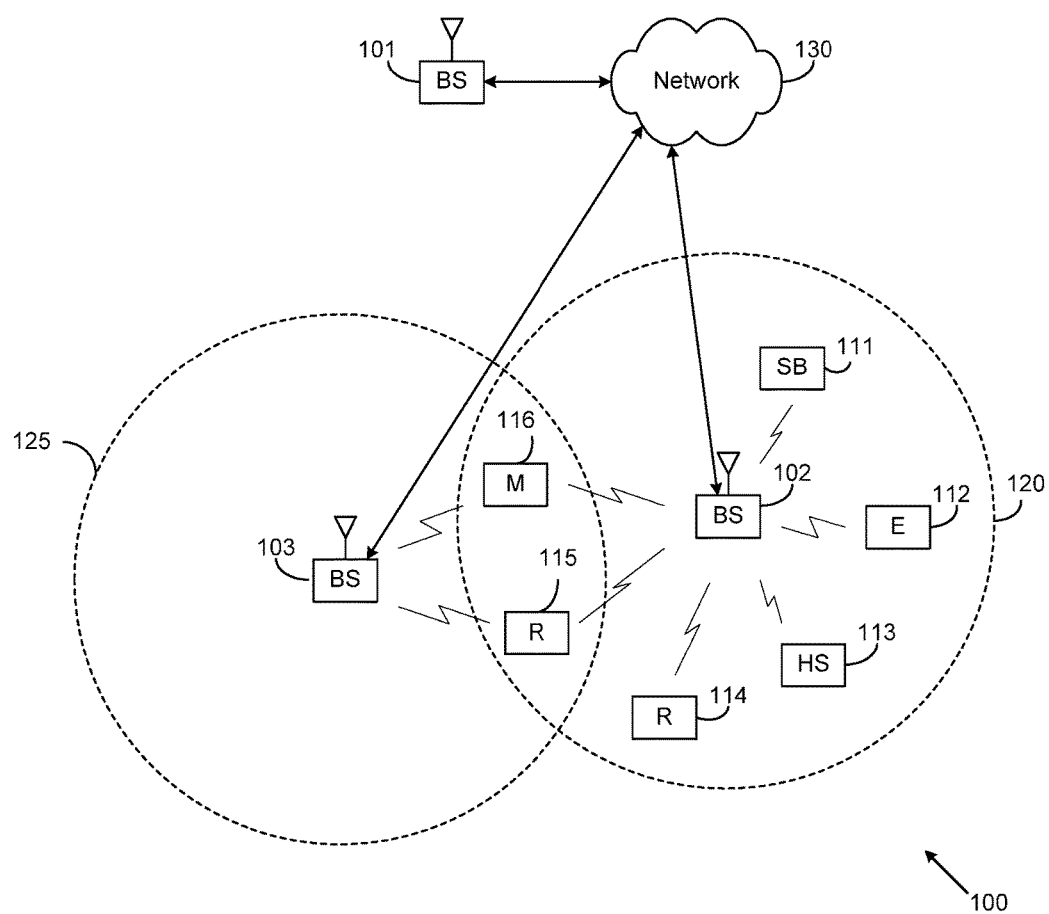
FIG. 1 illustrates an example wireless network according to various embodiments of the present disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure can be implemented in any suitably arranged wireless communication system.

List of Acronyms

2D: two-dimensional
MIMO: multiple-input multiple-output
SU-MIMO: single-user MIMO
MU-MIMO: multi-user MIMO
3GPP: 3rd generation partnership project
LTE: long-term evolution
UE: user equipment
eNB: evolved Node B or "eNB"
BS: base station
DL: downlink
UL: uplink
CRS: cell-specific reference signal(s)
DMRS: demodulation reference signal(s)
SRS: sounding reference signal(s)
UE-RS: UE-specific reference signal(s)
CSI-RS: channel state information reference signals
SCID: scrambling identity
MCS: modulation and coding scheme
RE: resource element
CQI: channel quality information -continued PMI: precoding matrix indicator
RI: rank indicator
MU-CQI: multi-user CQI
CSI: channel state information
CSI-IM: CSI interference measurement
CoMP: coordinated multi-point
DCI: downlink control information
UCI: uplink control information
PDSCH: physical downlink shared channel
PDCCH: physical downlink control channel
PUSCH: physical uplink shared channel
PUCCH: physical uplink control channel
PRB: physical resource block
RRC: radio resource control
AoA: angle of arrival
AoD: angle of departure The following documents and standards descriptions are hereby incorporated by reference into the present disclosure as if fully set forth herein: 3GPP Technical Specification (TS) 36.211 version 12.4.0, "E-UTRA, Physical channels and modulation" ("REF 1"); 3GPP TS 36.212 version 12.3.0, "E-UTRA, Multiplexing and Channel coding" ("REF 2"); 3GPP TS 36.213 version 12.4.0, "E-UTRA, Physical Layer Procedures" ("REF 3"); 3GPP TS 36.321 version 12.4.0, "E-UTRA, Medium Access Control (MAC) Protocol Specification" ("REF 4"); and 3GPP TS 36.331 version 12.4.0, "E-UTRA, Radio Resource Control (RRC) Protocol Specification" ("REF 5").

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of the present disclosure.

The wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network. Instead of "eNB", an alternative term "gNB" (general Node B) can also be used. Depending on the network type, other well-known terms can be used instead of "eNB" or "BS," such as "base station" or "access point." For the sake of convenience, the terms "eNB" and "BS" are used in this patent document to refer to network infrastructure components that provide wireless access to remote terminals. Also, depending on the network type, other well-known terms can be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which can be located in a small business (SB); a UE 112, which can be located in an enterprise (E); a UE 113, which can be located in a WiFi hotspot (HS); a UE 114, which can be located in a first residence (R); a UE 115, which can be located in a second residence (R); and a UE 116, which can be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 can communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, can have other shapes, including irregular shapes, depending upon the configuration of the eNBs and variations in the radio environment associated with natural and man-made obstructions.

As described in more detail below, one or more of eNB 101, eNB 102, and eNB 103 transmit to UEs 111-116 with precoder cycling and configure UEs 111-116 for CSI reporting as described in embodiments of the present disclosure. In various embodiments, one or more of UEs 111-116 receive and demodulate at least one transmission with precoder cycling as well as perform calculation and reporting for of CSI.

Although FIG. 1 illustrates one example of a wireless network 100, various changes can be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
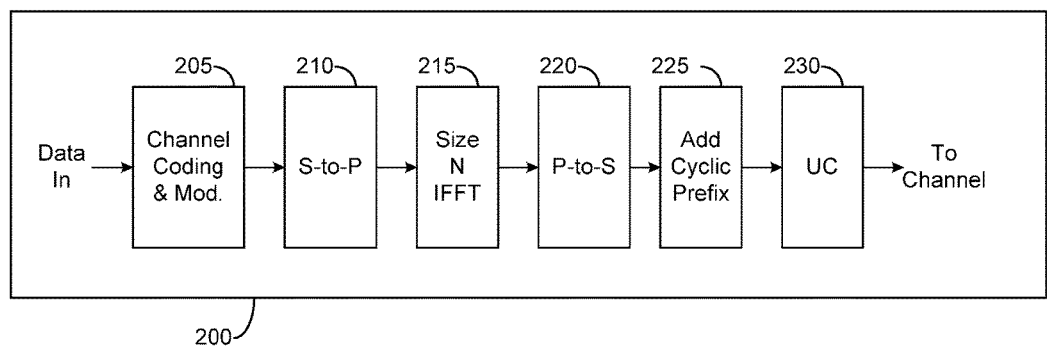
FIGS. 2A and 2B illustrate example wireless transmit and receive paths according to various embodiments of the present disclosure.
Figure 2B:
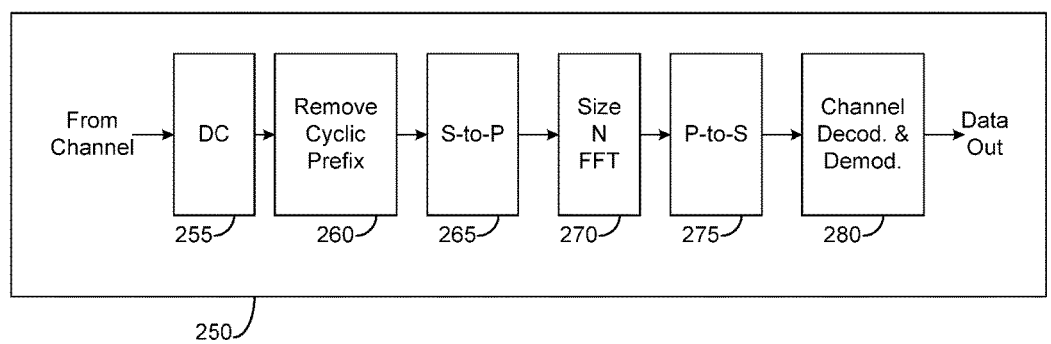

FIGS. 2A and 2B illustrate example wireless transmit and receive paths according to the present disclosure. In the following description, a transmit path 200 can be described as being implemented in an eNB (such as eNB 102), while a receive path 250 can be described as being implemented in a UE (such as UE 116). However, it will be understood that the receive path 250 could be implemented in an eNB and that the transmit path 200 could be implemented in a UE. In some embodiments, the receive path 250 is configured to receive and demodulate at least one transmission with precoder cycling as well as support channel quality measurement and reporting as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as convolutional, Turbo, or low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The 'add cyclic prefix' block 225 inserts a cyclic prefix to the time-domain signal. The up-converter 230 modulates (such as up-converts) the output of the 'add cyclic prefix' block 225 to an RF frequency for transmission via a wireless channel. The signal can also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

As described in more detail below, the transmit path 200 or the receive path 250 can perform signaling for CSI reporting. Each of the eNBs 101-103 can implement a transmit path 200 that is analogous to transmitting in the downlink to UEs 111-116 and can implement a receive path 250 that is analogous to receiving in the uplink from UEs 111-116. Similarly, each of UEs 111-116 can implement a transmit path 200 for transmitting in the uplink to eNBs 101-103 and can implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B can be implemented in software, while other components can be implemented by configurable hardware or a mixture of software and configurable hardware. For instance, the FFT block 270 and the IFFT block 215 can be implemented as configurable software algorithms, where the value of size N can be modified according to the implementation.

Furthermore, although described as using FFT and IFFT, this is by way of illustration only and should not be construed to limit the scope of the present disclosure. Other types of transforms, such as Discrete Fourier Transform (DFT) and Inverse Discrete Fourier Transform (IDFT) functions, could be used. It will be appreciated that the value of the variable N can be any integer number (such as 1, 2, 3, 4, or the like) for DFT and IDFT functions, while the value of the variable N can be any integer number that is a power of two (such as 1, 2, 4, 8, 16, or the like) for FFT and IFFT functions.

Although FIGS. 2A and 2B illustrate examples of wireless transmit and receive paths, various changes can be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Other suitable architectures could be used to support wireless communications in a wireless network.

Figure 3A:
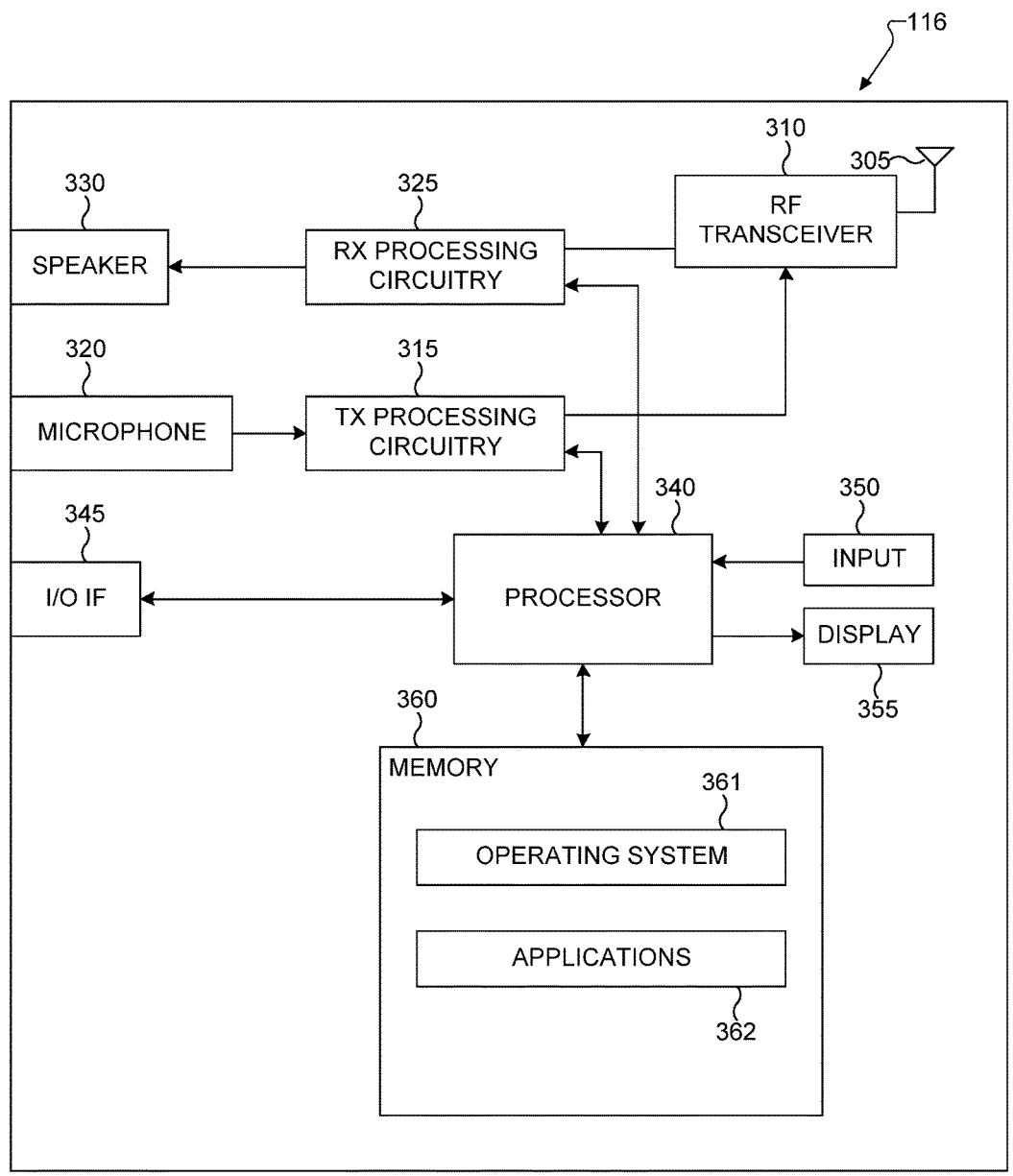
FIG. 3A illustrates an example user equipment according to various embodiments of the present disclosure.

FIG. 3A illustrates an example UE 116 according to the present disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of the present disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a processor 340, an input/output (I/O) interface (IF) 345, an input 350, a display 355, and a memory 360. The memory 360 includes an operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS program 361 stored in the memory 360 in order to control the overall operation of the UE 116. For example, processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as operations for CQI measurement and reporting for systems described in embodiments of the present disclosure as described in embodiments of the present disclosure. The processor 340 can move data into or out of the memory 360 as required by an executing process. In some embodiments, the processor 340 is configured to execute the applications 362 based on the OS program 361 or in response to signals received from eNBs or an operator. The processor 340 is also coupled to the I/O interface 345, which provides the UE 116 with the ability to connect to other devices such as laptop computers and handheld computers. The I/O interface 345 is the communication path between these accessories and the processor 340.

The processor 340 is also coupled to the input 350 (e.g., keypad, touchscreen, button etc.) and the display 355. The operator of the UE 116 can use the input 350 to enter data into the UE 116. The display 355 can be a liquid crystal display or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

As described in more detail below, the UE 116 can perform signaling and calculation for CSI reporting. Although FIG. 3A illustrates one example of UE 116, various changes can be made to FIG. 3A. For example, various components in FIG. 3A could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3A illustrates the UE 116 configured as a mobile telephone or smartphone, UEs could be configured to operate as other types of mobile or stationary devices.

Figure 3B:
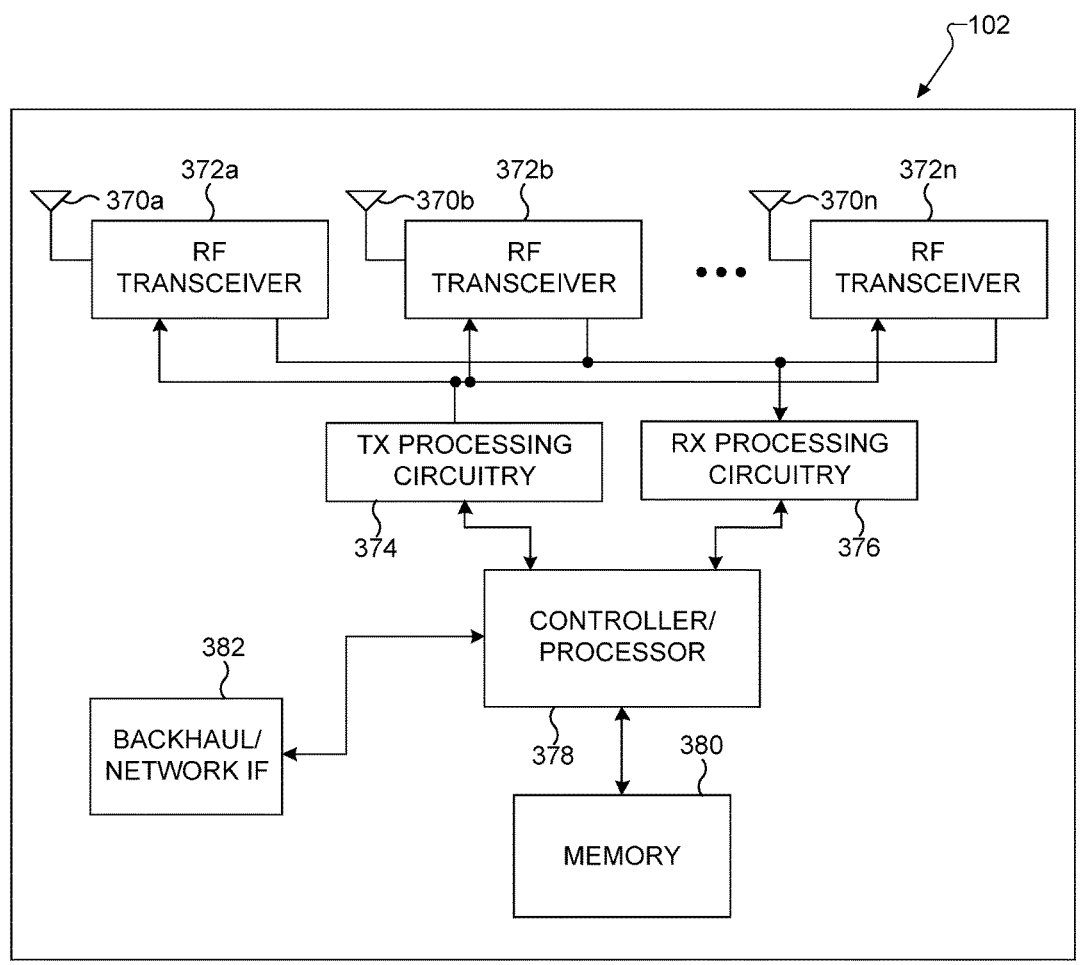
FIG. 3B illustrates an example enhanced NodeB (eNB) according to various embodiments of the present disclosure.

FIG. 3B illustrates an example eNB 102 according to the present disclosure. The embodiment of the eNB 102 shown in FIG. 3B is for illustration only, and other eNBs of FIG. 1 could have the same or similar configuration. However, eNBs come in a wide variety of configurations, and FIG. 3B does not limit the scope of the present disclosure to any particular implementation of an eNB. eNB 101 and eNB 103 can include the same or similar structure as eNB 102.

As shown in FIG. 3B, the eNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The eNB 102 also includes a controller/processor 378, a memory 380, and a backhaul or network interface 382.

The RF transceivers 372a-372n receive, from the antennas 370a-370n, incoming RF signals, such as signals transmitted by UEs or other eNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the eNB 102. For example, the controller/processor 378 could control the reception of forward channel signals and the transmission of reverse channel signals by the RF transceivers 372a-372n, the RX processing circuitry 376, and the TX processing circuitry 374 in accordance with well-known principles. The controller/processor 378 could support additional functions as well, such as more advanced wireless communication functions. In some embodiments, the controller/processor 378 includes at least one microprocessor or microcontroller.

The controller/processor 378 is also capable of executing programs and other processes resident in the memory 380, such as an OS. The controller/processor 378 is also capable of supporting channel quality measurement and reporting for systems having 2D antenna arrays as described in embodiments of the present disclosure. In some embodiments, the controller/processor 378 supports communications between entities, such as web RTC. The controller/processor 378 can move data into or out of the memory 380 as required by an executing process.

The controller/processor 378 is also coupled to the backhaul or network interface 382. The backhaul or network interface 382 allows the eNB 102 to communicate with other devices or systems over a backhaul connection or over a network. The interface 382 could support communications over any suitable wired or wireless connection(s). For example, when the eNB 102 is implemented as part of a cellular communication system (such as one supporting 5G or new radio access technology or NR, LTE, or LTE-A), the interface 382 could allow the eNB 102 to communicate with other eNBs over a wired or wireless backhaul connection. When the eNB 102 is implemented as an access point, the interface 382 could allow the eNB 102 to communicate over a wired or wireless local area network or over a wired or wireless connection to a larger network (such as the Internet). The interface 382 includes any suitable structure supporting communications over a wired or wireless connection, such as an Ethernet or RF transceiver.

The memory 380 is coupled to the controller/processor 378. Part of the memory 380 could include a RAM, and another part of the memory 380 could include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the eNB 102 (implemented using the RF transceivers 372a-372n, TX processing circuitry 374, and/or RX processing circuitry 376) perform configuration and signaling for CSI reporting.

Although FIG. 3B illustrates one example of an eNB 102, various changes can be made to FIG. 3B. For example, the eNB 102 could include any number of each component shown in FIG. 3A. As a particular example, an access point could include a number of interfaces 382, and the controller/processor 378 could support routing functions to route data between different network addresses. As another particular example, while shown as including a single instance of TX processing circuitry 374 and a single instance of RX processing circuitry 376, the eNB 102 could include multiple instances of each (such as one per RF transceiver).

Figure 4:
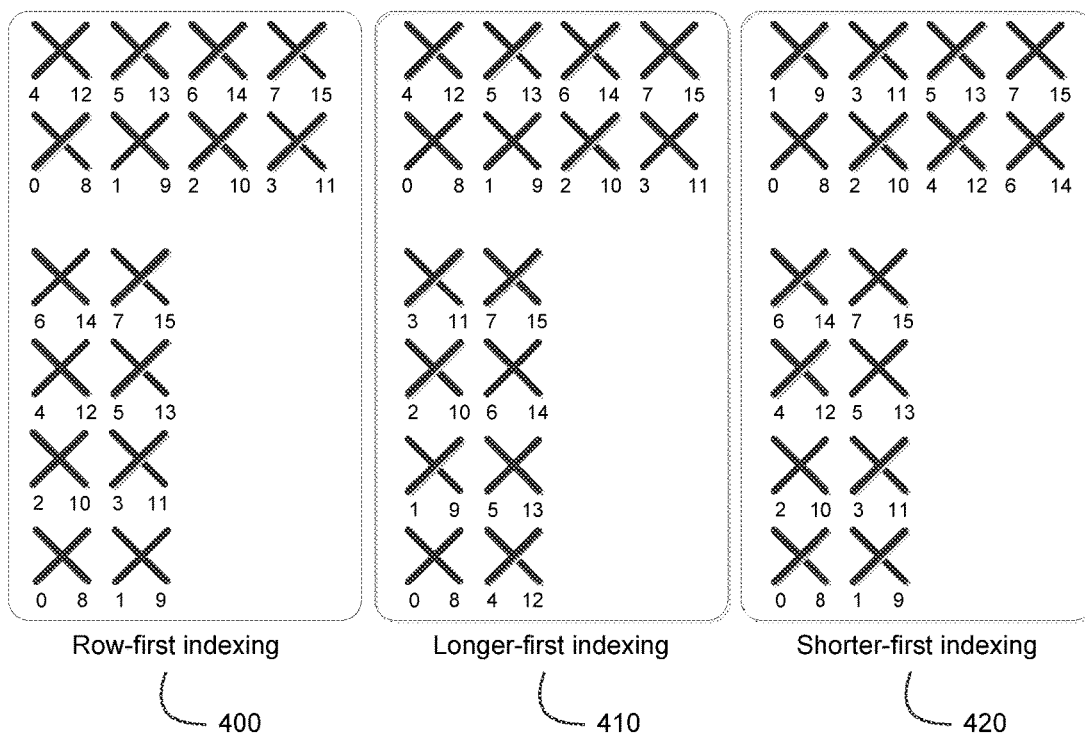
FIG. 4 illustrates example two-dimensional (2D) antenna arrays constructed from 16 dual-polarized elements arranged in a 4×2 or 2×4 rectangular format which can be utilized in various embodiments of the present disclosure.

FIG. 4 illustrates example two-dimensional (2D) antenna arrays constructed from 16 dual-polarized elements arranged in a 4×2 or 2×4 rectangular format which can be utilized in various embodiments of the present disclosure. In this illustrative embodiment, the 2D dual-polarized antenna port array includes $M_a$ rows and $N_a$ columns where $(M_a, N_a)=(2,4)$ and $(4,2)$. The embodiment of the 2D dual-polarized antenna port array shown in FIG. 4 is for illustration only. Other embodiments of the 2D dual-polarized antenna port array could be used without departing from the scope of the present disclosure.

The example 2D dual-polarized antenna port array arrangement results in a total of $2M_aN_a=16$ ports, each mapped to one CSI-RS port. The three indices 400, 410, and 420 are three examples in indexing the 16 antenna ports as a means of mapping antenna ports to precoding matrix elements. For row-first indexing 400, antenna ports associated with the same polarization group are indexed in a row-first manner regardless of $(M_a, N_a)$. For longer-first indexing 410, antenna ports associated with the same polarization group are indexed in a column-first manner when $M_a > N_a$, but row-first manner when $M_a \leq N_a$. For shorter-first indexing 420, antenna ports associated with the same polarization group are indexed in a row-first manner when $M_a > N_a$, but column-first manner when $M_a \leq N_a$. Indexing 400 is therefore termed row-first indexing while indexing 410 longer-first indexing and indexing 420 shorter-first indexing.

In these illustrative embodiments, both $M_a$ and $N_a$ can be configured by an eNB for a UE. In another example, rather than defining $M_a$ and $N_a$ as the number of rows and columns of the rectangular array of ports or port pattern, respectively, these two parameters can be defined as two-dimensional precoding codebook parameters. The values of $M_a$ and $N_a$ partly determine the manner in which a codebook (hence each precoding matrix element in the codebook) is mapped onto antenna ports of a one- or two-dimensional antenna array. This configuration can be performed with and without signaling the total number of antenna ports. When a UE is configured with a codebook, these parameters can be included either in a corresponding CSI process configuration or NZP (non-zero-power) CSI-RS resource configuration.

In LTE systems, precoding codebooks are utilized for CSI reporting. Two categories of CSI reporting modes are supported: PUSCH-based aperiodic CSI (A-CSI) and PUCCH-based periodic CSI (P-CSI). In each category, different modes are defined based on frequency selectivity of CQI and/or PMI, that is, whether wideband (one CSI parameter calculated for all the "set S subbands") or subband (one CSI parameter calculated for each "set S subband") reporting is performed. The supported CSI reporting modes are given in TABLE 1 and 2.

TABLE 1

CQI and PMI Feedback Types for PUSCH
(Aperiodic) CSI Reporting Modes

| | | PMI Feedback Type | | |
|---|---|---|---|---|
| | | No PMI | Single PMI | Multiple PMI |
| PUSCH CQI Feedback Type | Wideband (wideband CQI) | | | Mode 1-2 |
| | UE Selected (subband CQI) | | Mode 2-0 | Mode 2-2 |
| | Higher Layer-configured (subband CQI) | Mode 3-0 | Mode 3-1 | Mode 3-2 |

TABLE 2

CQI and PMI Feedback Types for PUCCH
(Periodic) CSI Reporting Modes

| | | PMI Feedback Type | |
|---|---|---|---|
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

In Rel.12 LTE, dual-stage precoding codebook enumerated with a first and a second PMI values ($i_1$ and $i_2$, respectively) are supported for 4 and 8 antenna ports. The first PMI value $i_1$ is associated with a group of four DFT beams/precoders. The second PMI value $i_2$, on the other hand, selects one out of four beams/precoders indicated with $i_1$, along with QPSK co-phasing between two polarization groups.

In Rel.13 LTE, a flexible codebook structure which accommodates 2D CSI-RS port patterns is supported for 'CLASS A' eMIMO-Type with 8, 12, and 16 antenna ports, where not only $(N_1, N_2)$ are configurable, but also oversampling factors for both dimensions $(O_1, O_2)$ and four types of codebook subset selections configured via RRC parameter codebook-Config. In addition, a single-stage beam selection codebook for 2, 4, or 8 antenna ports is also supported for 'CLASS B' eMIMO-Type.

Based on the above codebook, a resulting precoding matrix can be described in Equation 1. That is, the first stage precoder can be described as a Kronecker product of a first and a second precoding vector (or matrix), which can be associated with a first and a second dimension, respectively. This type is termed partial Kronecker Product (partial KP) codebook. The subscripts m and n in $W_{m,n}(i_{m,n})$ denote precoding stage (first or second stage) and dimension (first or second dimension), respectively. Each of the precoding matrices $W_{m,n}$ can be described as a function of an index which serves as a PMI component. As a result, the precoding matrix W can be described as a function of 3 PMI components $i_{1,1}, i_{1,2}, i_2$. The first stage pertains to a long-term component. Therefore, the first stage is associated with long-term channel statistics such as angle-of-departure (AoD) profile and AoD spread. On the other hand, the second stage pertains to a short-term component which performs selection, co-phasing, or any linear operation to the first component precoder $W_{1,1}(i_{1,1}) \otimes W_{1,2}(i_{1,2})$. In the present disclosure, $A \otimes B$ denotes the Kronecker product between two matrices A and B. The precoder $W_2$ ($i_2$), therefore, performs a linear transformation of the long-term component such as a linear combination of a set of basis functions or vectors associated with the column vectors of $W_{1,1}(i_{1,1}) \otimes W_{1,2}(i_{1,2})$).

$$W(i_{1,1}, i_{1,2}, i_2) = \underbrace{(W_{1,1}(i_{1,1}) \otimes W_{1,2}(i_{1,2}))}_{W_1(i_{1,1}, i_{1,2})} W_2(i_2) \quad \text{(Equation 1)}$$

Here, a UE measures a CSI-RS in a subframe designated to carry CSI-RS, calculates a CSI (including PMI, RI, and CQI where each of these three CSI parameters can include multiple components) based on the measurement, and reports the calculated CSI to a serving eNB 102.

The above precoding description is especially suitable when the serving eNB transmits non-precoded CSI-RS (NP CSI-RS). That is, a cell-specific one-to-one mapping between CSI-RS port and TXRU (transceiver unit) is utilized. Here, different CSI-RS ports have the same wide beam width and direction and hence generally cell wide coverage. This use case can be realized when the eNB configures the UE with 'CLASS A' eMIMO-Type which corresponds to NP CSI-RS. Other than CQI and RI, CSI reports associated with 'CLASS A' or 'nonPrecoded' eMIMO-Type include (assuming the partial KP design inherent in the Rel.13 codebook described above) a three-component PMI $\{i_{1,1}, i_{1,2}, i_2\}$.

Another type of CSI-RS applicable to FD-MIMO is beamformed CSI-RS (BF CSI-RS). For example, beamforming operation, either cell-specific or UE-specific, is applied on a non-zero-power (NZP) CSI-RS resource (including multiple ports). Here, at least at a given time/frequency CSI-RS ports have narrow beam widths and hence not cell wide coverage, and (at least from the eNB perspective) at least some CSI-RS port-resource combinations have different beam directions. This beamforming operation is intended to increase CSI-RS coverage or penetration. In addition, when UE-specific beamforming is applied to a CSI-RS resource (termed the UE-specific or UE-specifically beamformed CSI-RS), CSI-RS overhead reduction can be obtained when NZP CSI-RS resources are allocated efficiently through resource sharing (pooling) for multiple UEs either in time domain (for instance, aperiodic transmission), beam domain (UE-specific beamforming), or dynamic CSI-RS resource (re)configuration. When a UE is configured to receive BF CSI-RS from a serving eNB, the UE can be configured to report PMI parameters associated with $W_2$ ($W_{2,1}$ and/or $W_{2,2}$) without $W_1$ ($W_{1,1}$ and/or $W_{1,2}$) or, in general, associated with a single-stage precoder/codebook. This use case can be realized when the eNB configures the UE with 'CLASS B' eMIMO-Type which corresponds to BF CSI-RS. Other than CQI and RI, CSI reports associated with 'CLASS B' or 'beamformed' eMIMO-Type (with one CSI-RS resource and alternative codebook) include a one-component PMI n. Although a single PMI defined with respect to a distinct codebook, this PMI can be associated with the second-stage PMI component of 'CLASS A'/'nonPrecoded' codebooks $i_2$.

Therefore, given a precoding codebook (a set of precoding matrices $W(i_{1,1}, i_{1,2}, i_2)$), a UE measures a CSI-RS in a subframe designated to carry CSI-RS, calculates/determines a CSI (including PMI, RI, and CQI where each of these three CSI parameters can include multiple components) based on the measurement, and reports the calculated CSI to a serving eNB. In particular, this PMI is an index of a recommended precoding matrix in the precoding codebook. Similar to that for the first type, different precoding codebooks can be used for different values of RI. The measured CSI-RS can be one of the two types: non-precoded (NP) CSI-RS and beamformed (BF) CSI-RS. As mentioned, in Rel.13, the support of these two types of CSI-RS is given in terms of two eMIMO-Types: 'CLASS A' (with one CSI-RS resource) and 'CLASS B' (with one or a plurality of CSI-RS resources), respectively.

In scenarios where DL long-term channel statistics can be measured through UL signals at a serving eNB, UE-specific BF CSI-RS can be readily used. This is typically feasible when UL-DL duplex distance is sufficiently small. When this condition does not hold, however, some UE feedback is necessary for the eNB to obtain an estimate of DL long-term channel statistics (or any of its representation thereof). To facilitate such a procedure, a first BF CSI-RS transmitted with periodicity T1 (ms) and a second NP CSI-RS transmitted with periodicity T2 (ms), where $T1 \leq T2$. This approach is termed hybrid CSI-RS. The implementation of hybrid CSI-RS is largely dependent on the definition of CSI process and NZP CSI-RS resource.

As discussed above, utilizing UE-specific BF CSI-RS reduces the number of ports configured to each UE by applying beamforming on NP CSI-RS. For instance, a serving eNB can apply wideband beamforming on a 16-port NP CSI-RS to form a 2-port BF CSI-RS for a served UE. If each UE is configured with 2-port BF CSI-RS, the resulting total CSI-RS overhead is reduced when the number of co-scheduled UEs is less than 8—assuming the same transmission rate for NP and BF CSI-RS. However, although not all the served UEs require data transmission in every subframe, the number of served UEs per cell tends to be much larger than 8. Due to the burstiness and stochasticity of data traffic, UE-specific BF CSI-RS uses or requires an efficient CSI-RS resource allocation mechanism to ensure that the total CSI-RS overhead can be minimized or, conversely, the number of served UEs per cell can be maximized.

Therefore, there is a need to enable an efficient CSI-RS resource allocation mechanism for UE-specific BF CSI-RS.

Terms such as 'non-precoded' (or 'NP') CSI-RS and 'beamformed' (or 'BF') CSI-RS are used throughout the present disclosure. The essence of the present disclosure does not change when different terms or names are used to refer to these two CSI-RS types. For example, 'CSI-RS-A' and 'CSI-RS-B' can refer to or be associated with these two CSI-RS types. Essentially these two CSI-RS types are a first CSI-RS and a second CSI-RS. In another example, CSI-RS resource type can be used to differentiate those two modes of operation instead of CSI-RS type. CSI-RS resources associated with these two types of CSI-RS can be referred to as 'a first CSI-RS resource' and 'a second CSI-RS resource', or 'CSI-RS-A resource' and 'CSI-RS-B resource'. Subsequently, the labels 'NP' and 'BF' (or 'np' and 'bf') are examples and can be substituted with other labels such as '1' and '2', or 'A' and 'B', or TYPE1 and TYPE2, or CLASS-A and CLASS-B. In another example, a MIMO type or eMIMO-Type which can be associated with CSI reporting operation can be used to differentiate those two modes of operation instead of CSI-RS type. For example, a UE is configured with a MIMO type or eMIMO-Type associated with CSI reporting behaviors and, in addition, CSI measurement behaviors. Names of higher-layer or RRC parameters utilized in this invention disclosure are example and illustrative. Other names which serve same functionalities can be utilized.

The present disclosure includes at least four components: aperiodic CSI-RS (Ap-CSI-RS) mechanism, Ap-CSI-RS resource definition, Ap-CSI-RS resource selection or reconfiguration, and Ap-CSI-RS reference resource definition. Each of the four components can be used either by itself (without the other component) or in conjunction with at least one of the other four components.

Figure 5:
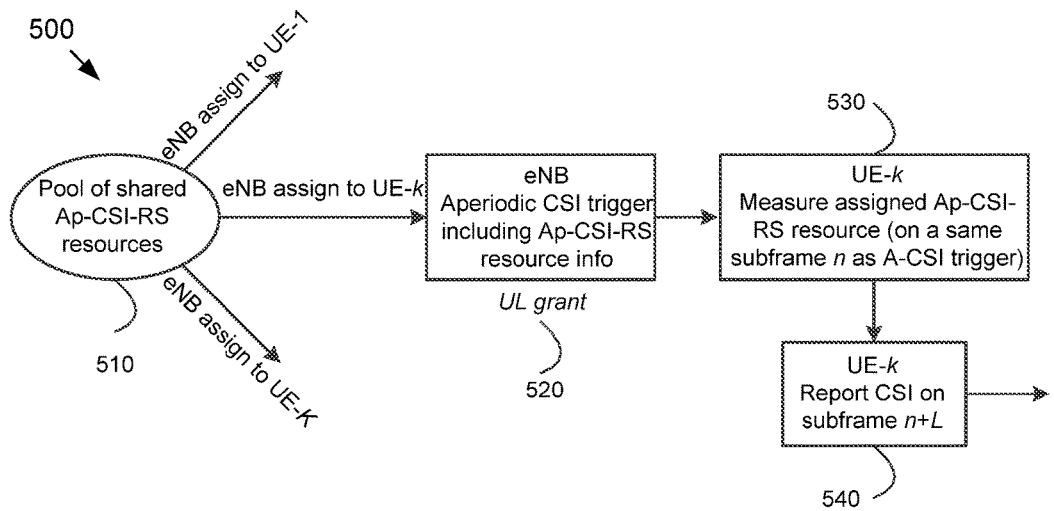
FIG. 5 illustrates an example procedure of operating aperiodic CSI-RS at an eNB and a UE according to various embodiments of the present disclosure.

For the first component (that is, aperiodic CSI-RS mechanism), FIG. 5 illustrates an example mechanism 500 for aperiodic CSI-RS (Ap-CSI-RS). Ap-CSI-RS is characterized by two primary features. First, a pool of CSI-RS resources is defined and shared among multiple served UEs (510). A CSI-RS resource from this pool can be assigned to a UE only when the UE measures CSI (hence a resource can only be used when the resource is needed). The UE needs to measure CSI when its associated serving eNB chooses to receive a CSI reporting calculated based on a most recent channel. This leads to a second primary feature. Ap-CSI-RS assignment is done in conjunction with an aperiodic CSI request from the serving eNB to a served UE (in this example, termed UE-k). Therefore, Ap-CSI-RS resource information is included in a DCI of an UL grant which contains an A-CSI request to UE-k in subframe n (520). Along with the A-CSI request, the Ap-CSI-RS itself, which is placed in the same DL subframe n as the A-CSI trigger and the Ap-CSI-RS resource information. Alternatively, the Ap-CSI-RS can be placed in another subframe following subframe n (at the expense of CSI reporting delay). In response to the CSI request and the Ap-CSI-RS resource information in subframe n (assuming that the Ap-CSI-RS is placed in subframe n), UE-k measures the associated Ap-CSI-RS assigned by the eNB (530) and reports a requested A-CSI in subframe n+L (540) where L is specified and can be scenario-dependent. For instance, a default value of L is 4 following Rel.13 LTE. This mechanism can be applied to both NP and UE-specific BF CSI-RS.

Although NP CSI-RS is cell-specific, its resource configuration is UE-specific. When used for NP CSI-RS, Ap-CSI-RS mechanism facilitates NP CSI-RS overhead reduction as the NP CSI-RS can be transmitted only when necessary. In turn, a served UE is assigned a CSI-RS resource and can measure NP CSI-RS only when necessary (aperiodically) thereby reducing computational complexity and hence UE power consumption. If applied to NP CSI-RS, channel measurement restriction can be utilized together with class A CSI reporting since CSI measurement (in time and frequency) is performed within the subframe containing Ap-CSI-RS.

Likewise, Ap-CSI-RS facilitates CSI-RS overhead reduction when applied to UE-specific BF CSI-RS. This is because UE-specific BF CSI-RS can be transmitted only when necessary thereby reducing the total CSI-RS overhead across all UEs. In turn, a served UE is assigned a CSI-RS resource and can measure BF CSI-RS only when necessary (aperiodically) thereby reducing computational complexity and hence UE power consumption.

For the second component (that is, aperiodic CSI-RS resource definition), since Ap-CSI-RS is transmitted and measured aperiodically (whenever required), an Ap-CSI-RS resource is not characterized by subframe configuration which includes subframe offset and periodicity (as in the legacy CSI-RS resource). Instead, an Ap-CSI-RS resource is characterized by at least one of the following parameters: the number of assigned CSI-RS ports, a set of CSI-RS port numbers, and a CSI-RS pattern configuration. The second and third parameters are described as follows.

Regarding the second parameters, to define a set of CSI-RS port numbers assigned to a UE, a master set of (available) port numbers $\{Port_0, Port_0+1, \ldots, Port_0+N_{PORT,MAX}-1\}$ is needed. At least two options are available. A first option is to define a new master set of ports where a previously unused value of $Port_0$ (so that any value in the master set $\{Port_0, Port_0+1, \ldots, Port_0+N_{PORT,MAX}-1\}$ is also previously unused) is chosen. For example, by choosing $Port_0=200$, a master set of ports $\{200, 201, \ldots, 199+N_{PORT,MAX}\}$, different from the available CSI-RS ports in Rel.13 $\{15, 16, \ldots, 30\}$, is defined. A second option is to extend the existing CSI-RS ports (in Rel.13 LTE) by choosing $Port_0=15$ and increase $N_{PORT,MAX}$ beyond the current value of 16 which results in a master set of CSI-RS ports $\{15, 16, \ldots, 14+N_{PORT,MAX}\}$. The second option allows usage of the legacy CSI-RS ports for Ap-CSI-RS whenever the ports are available.

For a given number of CSI-RS ports $N_{PORT}$, an $N_{PORT}$-port CSI-RS resource can be specified in terms of a port subset of the master set $\{Port_0, Port_0+1, \ldots, Port_0+N_{PORT,MAX}-1\}$. At least two options are possible.

A first option for port subset selection follows the legacy Rel.13 LTE and assuming that the second master set option (see the previous paragraph), an $N_{PORT}$-port CSI-RS resource is always associated with port numbers $\{15, 16, \ldots, 14+N_{PORT}\}$. That is, the first CSI-RS port number is always 15 and the assigned CSI-RS port numbers are consecutive for any CSI-RS resource assignment. In this case, the set of CSI-RS port numbers is fixed for a given number of CSI-RS ports. Therefore, there is no need to indicate or signal port subset selection in Ap-CSI-RS resource configuration.

A second option for port subset selection which offers more flexible resource allocation and increased number of resource configurations is to allow a CSI-RS resource configuration to be associated with port numbers $\{Port(0), Port(1), \ldots, Port(N_{PORT}-1)\}$ where $Port(i)$ can be any port number taken from the master set. A constraint of $Port(i)<Port(k), i>k$ can be further imposed. As an example, antenna ports $\{17, 18, 21, 22\}$ can be assigned to a UE for $N_{PORT}=4$. For a given value of $N_{PORT,MAX}$ and $N_{PORT}$, a total of $$N_{cand} = \binom{N_{PORT,MAX}}{N_{PORT}}$$

candidates for CSI-RS port subset selection are available. Thus, if port subset selection is unrestricted, all these candidates are available. Alternatively, only a part of these available candidates can be used. In that case, a restricted subset of available candidates $$N_{cand} < \binom{N_{PORT,MAX}}{N_{PORT}}$$

is used.

For this second port subset selection option, port subset selection is to be signaled and indicated in Ap-CSI-RS resource configuration. For this purpose, either a length-$N_{PORT,MAX}$ bitmap (indicating which port numbers are assigned to a UE) or a $\lceil \log_2 N_{cand} \rceil$-bit port subset indicator can be used. The bitmap is applicable for either unrestricted or restricted subset selection. The subset indicator, on the other hand, is suitable for restricted subset selection.

Regarding the third parameter, for a given number of CSI-RS ports $N_{PORT}$, an $N_{PORT}$-port CSI-RS resource can also be specified in terms of a T-F (time frequency) pattern configuration, termed CSI reference signal configuration in Table 6.10.5.2.1 of REF1, but referred to as pattern configuration in this disclosure. This pattern configuration indicates locations of CSI-RS REs in time and frequency within a subframe. In the legacy Rel.12 LTE, this is indicated by a 32-value RRC parameter resourceConfig-r10 or 'CSI reference signal configuration' in Table 6.10.5.2.1 of REF1).

Based on the above description of Ap-CSI-RS resource configuration, the following example Ap-CSI-RS resource pooling procedure can be described in a three-step procedure as follows. In a first step, a serving eNB starts from a master set of N PORT,MAX CSI-RS antenna port numbers {Port$_0$, Port$_0$+1, . . . , Port$_0$+$N_{PORT,MAX}$−1}. In a second step, if the first option of port subset selection is utilized, an aperiodic CSI-RS (Ap-CSI-RS) resource is characterized with the number of CSI-RS ports $N_{PORT}$ and a pattern configuration. If the second option of port subset selection is utilized, an aperiodic CSI-RS (Ap-CSI-RS) resource is characterized with the number of CSI-RS ports $N_{PORT}$ a bitmap or an indicator associated with a set of antenna port numbers {Port(0), Port(1), . . . , Port($N_{PORT}$−1)}, and a pattern configuration. In a third step, the serving eNB assigns (at least) one $N_{PORT}$ CSI-RS resource to a served UE-k associated with the resource configuration in Step 2.

In addition to those three parameters, other configuration parameters can be incorporated in CSI-RS resource configuration (as a part of CSI-RS resource configuration) for aperiodic CSI-RS. Some examples are given as follows: energy-per-RE ratio relative to PDSCH; eMIMO-Type (either 'nonPrecoded'/'CLASS A' or 'beamformed'/'CLASS B'); a parameter indicating whether the CSI-RS is NZP (non-zero-power) or ZP (zero-power); a parameter indicating whether the CSI-RS configuration is periodic or aperiodic.

For the third component (that is, aperiodic CSI-RS resource selection or reconfiguration), at least three options are possible for signaling each of the three parameters associated with CSI-RS resource configuration (number of antenna ports, T-F pattern configuration, and port subset configuration). A first option is to use RRC signaling per UE to perform semi-static (re)configuration of CSI-RS resource. Several served UEs can be configured to share a same CSI-RS resource assignment or have overlapping resource assignments. A second option is to use UL grant by incorporating the parameter in an associated DCI which carries A-CSI request (trigger). Therefore, CSI-RS resource configuration is signaled dynamically. A third option is to use either periodic or aperiodic resource (re)configuration using a similar principle to semi-persistent scheduling (SPS). That is, an UL grant is used to signal a reconfigured CSI-RS resource assignment to a served UE-k. This CSI-RS resource assignment can be accompanied with A-CSI request (trigger) or signaled by itself. This CSI-RS resource (re)configuration can either be performed every X ms where X can be configured via RRC signaling, or initiated with activation/deactivation procedure based on DL assignments or UL grants. If periodic resource reconfiguration is used, the value of X can be chosen large such as in the order of 200-ms or 320-ms.

The third option allows a more dynamic resource reconfiguration (which is not possible with the first option since RRC configuration incurs large delay) without incurring large DL signaling overhead (which is the case with the second option). Therefore, it allows a more efficient pooling of Ap-CSI-RS resources with reasonable DL signaling overhead. To set up a UE for the third option, an RRC configuration similar to the one for SPS-ConfigDL (TS 36.331 REF5) can be used. Only a few parameters are applicable (for example, parameters similar to semiPersistSchedIntervalDL and/or numberOfConfSPS-Processes).

Considering the aforementioned three signaling options, applicable to each of the three parameters, TABLE 3-A and 3-B describe several possible combinations for the first and the second options of port subset selection, respectively.

TABLE 3-A

Options for DL signaling mechanism of CSI-RS resource configuration with fixed port subset selection (Opt. 1)

| | Signaling mechanism | |
|---|---|---|
| Alt | No. antenna ports $N_{PORT}$ | T-F pattern configuration |
| 1.1 | RRC signaling (semi-static) | RRC signaling (semi-static) |
| 1.2 | RRC signaling (semi-static) | Every UL grant which carries A-CSI request (dynamic) |
| 1.3 | RRC signaling (semi-static) | In one UL grant which carries A-CSI request (dynamic, semi-persistent) per X ms (X = CSI-RS resource reconfiguration periodicity) |
| 2.2 | Every UL grant which carries A-CSI request (dynamic) | Every UL grant which carries A-CSI request (dynamic) |
| 3.3 | In one DL assignment or UL grant which carries A-CSI request (dynamic, semi-persistent), e.g. per X ms (X = CSI-RS resource reconfiguration periodicity) or aperiodically | In one DL assignment or UL grant which carries A-CSI request (dynamic, semi-persistent), e.g. per X ms (X = CSI-RS resource reconfiguration periodicity) or aperiodically |

TABLE 3-B

Options for DL signaling mechanism of CSI-RS resource configuration with flexible port subset selection (Opt. 2)

Signaling mechanism

| Alt | No. antenna ports $N_{PORT}$ | T-F pattern configuration | Port subject $\left\{ \begin{array}{l} Port(0), Port(1), \ldots, \\ Port\ (N_{PORT}-1) \end{array} \right\}$ |
|---|---|---|---|
| 1.1.1 | RRC signaling (semi-static) | RRC signaling (semi-static) | RRC signaling (semi-static) |
| 1.1.2 | RRC signaling (semi-static) | RRC signaling (semi-static) | Every UL grant which carries A-CSI request (dynamic) |
| 1.1.3 | RRC signaling (semi-static) | RRC signaling (semi-static) | In one DL assignment or UL grant which carries A-CSI request (dynamic, semi-persistent), e.g. per X ms (X = CSI-RS resource reconfiguration periodicity) or aperiodically |
| 1.2.1 | RRC signaling (semi-static) | Every UL grant which carries A-CSI request (dynamic) | RRC signaling (semi-static) |
| 1.3.1 | RRC signaling (semi-static) | In one DL assignment or UL grant which carries A-CSI request (dynamic, semi-persistent), e.g. per X ms (X = CSI-RS resource reconfiguration periodicity) or aperiodically | RRC signaling (semi-static) |
| 1.2.2 | RRC signaling (semi-static) | Every UL grant which carries A-CSI request (dynamic) | Every UL grant which carries A-CSI request (dynamic) |
| 1.3.3 | RRC signaling (semi-static) | In one DL assignment or UL grant which carries A-CSI request (dynamic, semi-persistent), e.g. per X ms (X = CSI-RS resource reconfiguration periodicity) or aperiodically | In one DL assignment or UL grant which carries A-CSI request (dynamic, semi-persistent), e.g. per X ms (X = CSI-RS resource reconfiguration periodicity) or aperiodically |
| 2.2.2 | Every UL grant which carries A-CSI request (dynamic) | Every UL grant which carries A-CSI request (dynamic) | Every UL grant which carries A-CSI request (dynamic) |
| 3.3.3 | In one DL assignment or UL grant which carries A-CSI request (dynamic, semi-persistent), e.g. per X ms (X = CSI-RS resource reconfiguration periodicity) or aperiodically | In one DL assignment or UL grant which carries A-CSI request (dynamic, semi-persistent), e.g. per X ms (X = CSI-RS resource reconfiguration periodicity) or aperiodically | In one DL assignment or UL grant which carries A-CSI request (dynamic, semi-persistent), e.g. per X ms (X = CSI-RS resource reconfiguration periodicity) or aperiodically |

For each of the options in TABLE 3-A and 3-B, at least a CSI request field in the DCI of an UL grant (which includes an associated aperiodic CSI-RS) is needed to trigger A-CSI. The CSI request field can include one or multiple bits where each bit is associated with a cell. In addition, Ap-CSI-RS parameter(s) which need to be configured dynamically (a subset of the number of ports, T-F pattern configuration, and/or port subset) are also included in the DCI of the UL grant. These configuration parameters can be defined as separate parameters or jointly with the CSI request field.

When a UE is configured with K CSI-RS resources (or resource configurations), one CSI request field (which can include one or multiple bits) can be used for each of the K CSI-RS resources (or resource configurations). When k of these K CSI request fields are set to 1, CSI-RS associated with each of these k CSI-RS resources (or resource configurations) is transmitted in the DL subframe containing the UL grant.

When a UE is configured with two (possibly different) eMIMO-Type setups in one CSI process where each eMIMO-Type setup is associated with one or more CSI-RS resources (or resource configurations), one CSI request field (which can include one or multiple bits) can be used for each of the two eMIMO-Type setups. When either one or both CSI request fields are set to 1, CSI-RS associated with each triggered eMIMO-Type setup is transmitted in the DL subframe containing the UL grant.

When a combination of semi-static (RRC signaling) and either semi-persistent or dynamic signaling is used (such as Opt. 1.1, 1.2, or 1.3 in TABLE 3-A; Opt. 1.1.1, 1.1.2, 1.1.3, 1.2.1, 1.3.1, 1.2.2, or 1.3.3 in TABLE 3-B), at least one (NZP or ZP) CSI-RS resource configuration parameter is semi-statically configured and at least one CSI-RS resource configuration parameter is either semi-persistently or dynamically configured. In this case, the semi-static CSI-RS resource configuration effectively indicates that the UE is semi-statically configured with a plurality of ($K_A$) CSI-RS resources (where $K_A$ is the number of possible CSI-RS resources or resource configurations associated with the semi-statically configured parameters). The second signaling—either semi-persistent or dynamic—selects one CSI-RS resource or a subset of CSI-RS resources from the $K_A$ semi-statically configured CSI-RS resources. Therefore, instead of defining CSI-RS resources in terms of parameters, the semi-static (higher-layer or RRC) signaling can instead configure the UE a set of $K_A$ CSI-RS resources and the semi-persistent or dynamic signaling can select one of out of $K_A$ CSI-RS resources. Each of these CSI-RS resources can either be NZP or ZP.

In the present disclosure, several embodiments of CSI-RS resource (re)configuration scheme (referred above as semi-persistent resource reconfiguration) with at least one CSI-RS resource configuration parameter signaled using the third option are given. For each of the following embodiments, when a UE is configured with a plurality of CSI processes or component carriers, one CSI-RS resource (re)configuration (activation/release or activation/deactivation) can be associated with one CSI process or component carrier. Alternatively, one CSI-RS resource (re)configuration (activation/release or activation/deactivation) can be associated with a plurality of CSI processes or component carriers. Alternatively, one CSI-RS resource (re)configuration (activation/release or activation/deactivation) can be associated with all the CSI processes or component carriers.

In a first embodiment (embodiment 1.A), an activation-release/deactivation mechanism similar to semi-persistent scheduling is utilized to reconfigure CSI-RS resource. In this embodiment, UL grants or DL assignments on PDCCH or EPDCCH are used to reconfigure CSI-RS resource. Therefore, an UL grant or DL assignment used for this purpose includes at least one DCI field either for selecting one out of multiple choices of CSI-RS resource configuration (which are, for instance, configured via higher layer signaling as a part of CSI-RS resource configuration ASN.1 Information Element) or for setting the value of at least one CSI-RS resource configuration parameter. This field can be a part of an existing DCI format (such as DCI format 0 or 4 for UL grant, or format 1A, 2/2A/2B for DL assignment) or a new DCI format specifically designed for CSI-RS resource reconfiguration (activation/release or activation/deactivation). The UL grant (or DL assignment) is signaled to the UE via PDCCH or EPDCCH and masked by a special RNTI (such as CSI-RNTI).

Figure 6:
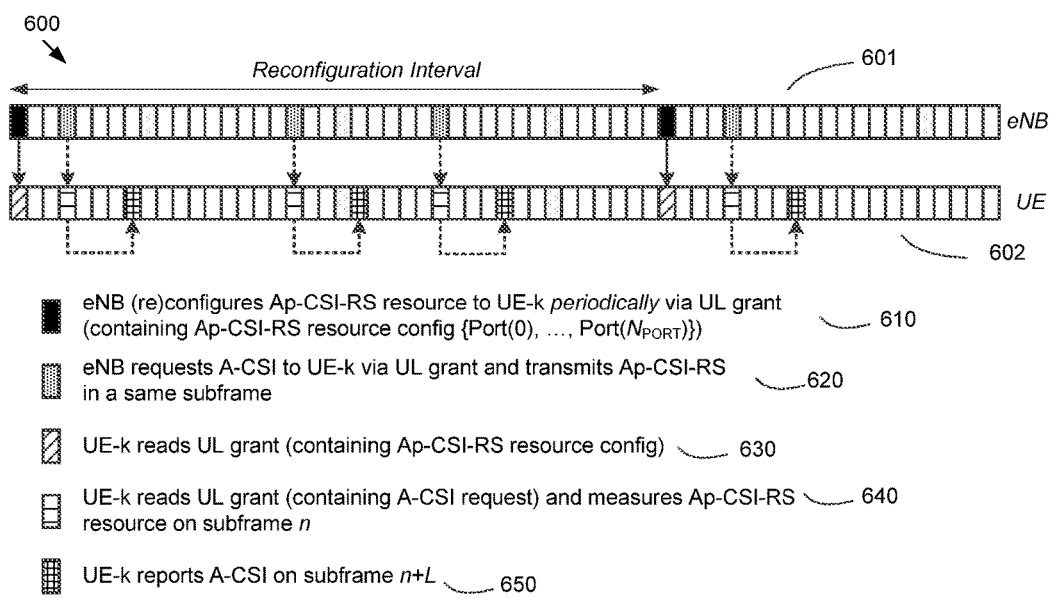
FIG. 6 illustrates an example of CSI-RS resource reconfiguration mechanism for aperiodic CSI-RS according to various embodiments of the present disclosure.
Figure 7A:
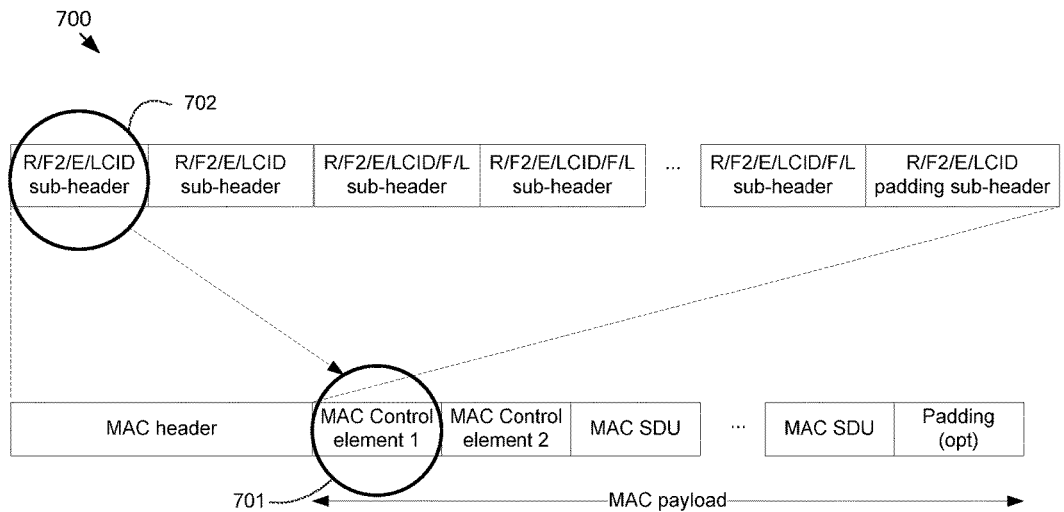
FIG. 7A illustrates an example of MAC control element (MAC CE) transmission according to various embodiments of the present disclosure.
Figure 7B:
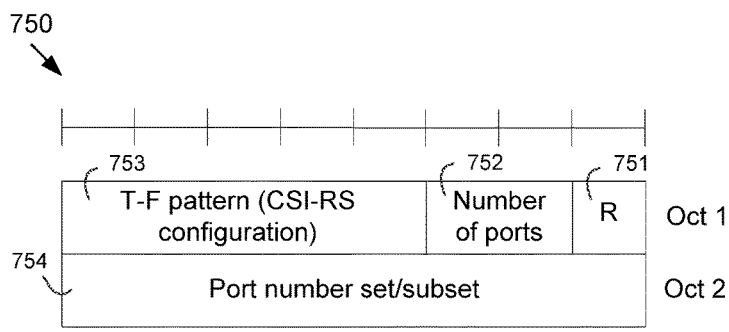
FIG. 7B illustrates an example format of MAC CE for CSI-RS resource configuration pertaining to aperiodic CSI-RS according to various embodiments of the present disclosure.

FIG. 6 describes an example eNB and UE operations 600 (in terms of timing diagram associated with eNB in 601 and UE in 602) when at least one CSI-RS resource configuration parameter is signaled using the third option. For example, this corresponds to Opt. 1.3 or 3.3 in TABLE 3-A, or Opt. 1.1.3, 1.3.1, 1.3.3, or 3.3.3 in TABLE 3-B. In this embodiment, Ap-CSI-RS resource is reconfigured every X ms in subframe(s) 610 via an UL grant (or an UL-related grant or, alternatively, a DL assignment) which carries Ap-CSI-RS resource configuration information (including the DCI field mentioned above). This configuration information can be accompanied with an A-CSI request/trigger or signaled by itself. Upon receiving a DL subframe from 610, a served UE-k reads the configuration information in 630. Based on this configuration information, the eNB requests A-CSI to UE-k via an UL grant (containing A-CSI trigger) while transmitting Ap-CSI-RS within the same subframe(s) 620. Upon receiving a DL subframe from 640—containing an A-CSI request/trigger—UE-k measures the transmitted Ap-CSI-RS (in subframe n) according to the resource configuration information received in subframe(s) 630, and performs CSI calculation. The resulting A-CSI is reported to the eNB in subframe(s) 650. In the example in FIG. 6, the semi-persistently configured CSI-RS resource includes a set of the number of ports.

Although the above example assumes periodic resource reconfiguration (every X ms), aperiodic resource reconfiguration using activation and deactivation based on UL grant or DL assignment can also be used.

The above semi-persistent CSI-RS resource allocation mechanism, applied to NZP CSI-RS resource, can be described as follows. First, a UE receives a dynamic trigger/release containing a selection from multiple higher-layer-configured NZP CSI-RS resources. These multiple CSI-RS resources can be associated with a first set of configured parameters (set values of CSI-RS resource configuration parameters) or simply a list of $K_A$ CSI-RS resources. Likewise, dynamic trigger or release can indicate either a [log $(K_A)$]-bit DCI field or another set of parameters which, together with the first parameter set, further indicates the selected CSI-RS resource. In this embodiment, each NZP CSI-RS resource can be either periodic or aperiodic CSI-RS resource. Second, for an activation trigger received in subframe n, the transmission of the associated NZP CSI-RS resource will start no earlier than subframe n+Y1 where Y1>0. Third, for a release (deactivation) trigger received in subframe n, the transmission of the associated NZP CSI-RS resource will stop after subframe n+Y1 where Y1>0. Fourth, if an UL grant or UL grant-like mechanism is used to trigger CSI-RS which is placed or transmitted in a same subframe as the UL grant, the value of Y1 or Y2 can be aligned with that of A-CSI. The same holds if a DL grant is used instead.

In a second embodiment (embodiment 1.B), an activation-release/deactivation mechanism (similar to semi-persistent scheduling) is also utilized to reconfigure CSI-RS resource, but instead of using PDCCH, MAC control element (MAC CE) is used. Here, a new type of MAC CE can be defined for the purpose of reconfiguring CSI-RS resource. For example, this type of MAC CE can be termed "CSI-RS resource reconfiguration MAC control element (MAC CE)". For each of the following embodiments using MAC CE, when a UE is configured with a plurality of CSI processes or component carriers, one CSI-RS resource activation/release can be associated with one CSI process or component carrier. Alternatively, one CSI-RS resource activation/release can be associated with a plurality of CSI processes or component carriers. Alternatively, one CSI-RS resource activation/release can be associated with all the CSI processes or component carriers.

This CSI-RS resource reconfiguration MAC CE is signaled to the UE via DL-SCH and included in a MAC PDU. Since the number of CSI-RS resource configuration parameters (as well as the length of each parameter) included in the MAC CE remains the same, the size of CSI-RS resource reconfiguration MAC CE can be fixed. Therefore, its associated MAC PDU sub-header includes solely of the 4 header fields R/F2/E/LCID (cf. REF4 section 6.1.2). The arrangement of CSI-RS resource configuration MAC CE can be illustrated in diagram 700 of FIG. 7A where MAC CE 1 (701) is designated as a CSI-RS resource configuration MAC CE and associated with MAC PDU sub-header 702. The 5-bit LCID (logical channel ID) indicates the type of logical channel. In this case, CSI-RS resource configuration MAC CE can utilize any of the reserved hypotheses (within 01011-10111-cf. Table 6.2.1-1 of REF4).

An example of a MAC CE design for CSI-RS resource reconfiguration is as follows. First, the MAC CE design includes at least one CSI-RS resource configuration parameter, each written as a binary (bit) sequence and arranged in an octet-aligned format. For instance, if all the three parameters mentioned above (number of ports, T-F pattern, and port number set) are configurable via a MAC CE, three fields are included in the CSI-RS resource configuration MAC CE. This is illustrated in diagram 750 of FIG. 7B where three fields 752 (number of CSI-RS ports $N_{PORT}$, 2 bits—4 hypotheses), 753 (T-F pattern, 5 bits—32 hypotheses), and 754 (port number set, 8 bits—up to 256 hypotheses) are included in a MAC CE with a fixed size of two octets. A one-bit reserved field R (751) is added at the beginning to fit the three fields into a two-octet codeword. Alternatively, if port number set is not needed (for instance, configured via higher layer signaling, or simply fixed to {15, 16, . . . , 14+$N_{PORT}$}), only one octet may be needed.

The above semi-persistent CSI-RS resource allocation schemes (the first and the second embodiments) can also be used for ZP CSI-RS resource.

The above semi-persistent CSI-RS resource allocation schemes (the first and the second embodiments are used and applicable for aperiodic CSI-RS. Alternatively, these first and the second embodiments can also be applied to periodic CSI-RS (that which is associated with subframe configuration in CSI-RS resource configuration—such as subframe offset and periodicity). When applied to periodic CSI-RS, each of the two schemes can be used to start/activate or stop/deactivate CSI-RS measurement at a UE. For the first embodiment, a DCI field in an UL grant or a DL assignment is used to signal the start or the stop of CSI measurement associated with a selected CSI-RS resource. For the second embodiment, the CSI-RS resource reconfiguration MAC CE is used to signal the start or the stop of CSI measurement associated with a selected CSI-RS resource.

For either embodiment (1.A or 1.B), two possibilities exist. First, the size and content of the DCI field (first embodiment) or MAC CE (second embodiment) can be different from that used for aperiodic CSI-RS. In this case, the selected CSI-RS resource is configured for the UE via higher layer signaling. Therefore, the DCI field (first embodiment) or the MAC CE (second embodiment) simply signals START (activate) or STOP (deactivate). Second, the size and content of the DCI field (first embodiment) or MAC CE (second embodiment) are identical to that used for aperiodic CSI-RS. In this case, the selected CSI-RS resource is indicated in the DCI field (first embodiment) or the MAC CE (second embodiment)—selected out of a plurality of ($K_A$) resources which are configured for the UE via higher-layer signaling—in the same manner as that for aperiodic CSI-RS (cf. FIGS. 7A and 7B).

For Ap-CSI-RS, several schemes exist in designing higher-layer (such as RRC) CSI-RS resource configuration.

In a first scheme, Rel.13 CSI-RS resource configuration (based on periodic CSI-RS resource configuration) is reused but unused configuration parameters such as CSI-RS subframe configuration (periodicity and subframe offset) are ignored when the CSI-RS resource is configured as aperiodic. For this embodiment, a parameter which indicates whether the CSI-RS resource is periodic or aperiodic (or whether aperiodic is ON) can be added inside the CSI-RS resource configuration information. This embodiment can be described in the following example ASN.1 setup in TABLE 4-A when the number of antenna ports and T-F pattern (resourceConfig) are configured semi-statically via RRC signaling. When CSI-RS-Alloc-r14 is set as {aperiodic}, subframeConfig-r10 is unused.

TABLE 4-A

```
CSI-RS-Config-r10 ::=      SEQUENCE {
    csi-RS-r10                 CHOICE {
        release                    NULL,
        setup                      SEQUENCE {
            antennaPortsCount-r10      ENUMERATED {an1, an2, an4, an8},
            resourceConfig-r10         INTEGER (0..31),
            subframeConfig-r10         INTEGER (0..154),
            p-C-r10                    INTEGER (-8..15)
            CSI-RS-Alloc-r14                ENUMERATED {periodic, aperiodic}
OPTIONAL       -- Need OR
        }
    }                                              OPTIONAL,        -- Need ON
    zeroTxPowerCSI-RS-r10      ZeroTxPowerCSI-RS-Conf-r12           OPTIONAL
    -- Need ON
}
```

In a second scheme, a new CSI-RS resource configuration for aperiodic CSI-RS is used. For this embodiment, a parameter which indicates whether the CSI-RS resource is periodic or aperiodic (or whether aperiodic is ON) can be added to select between the legacy Rel.13 CSI-RS resource configuration (based on periodic CSI-RS resource configuration) and aperiodic CSI-RS resource configuration. This embodiment can be described in the example ASN.1 setup in TABLE 4-B when the number of antenna ports and T-F pattern (resourceConfig) are configured semi-statically via RRC signaling. In this case, either port subset is not configurable or configured dynamically or semi-dynamically. To choose between the legacy periodic CSI-RS resource configuration and the aperiodic CSI-RS configuration, a parameter aperiodic CSI-RS-r14 is used in the example description in TABLE 4-C.

TABLE 4-B

```
CSI-RS-Config-Ap-r14 ::=   SEQUENCE {
    csi-RS-Ap-r14              CHOICE {
        release                    NULL,
        setup                      SEQUENCE {
            antennaPortsCount-r10      ENUMERATED {an1, an2, an4, an8},
            resourceConfig-r10         INTEGER (0..31),
```

TABLE 4-B-continued

```
        p-C-r10              INTEGER (-8..15)
    }
  }                                       OPTIONAL,     -- Need ON
  zeroTxPowerCSI-RS-Ap-r14    ZeroTxPowerCSI-RS- Ap-Conf-r14
  OPTIONAL          -- Need ON
}
```

TABLE 4-C

```
CSI-RS-Config-v14 ::=    SEQUENCE {
    eMIMO-Type-r13       CSI-RS-ConfigEMIMO-r13      OPTIONAL -- Need ON
    CSI-RS-Alloc-r14     CSI-RS-Config-PvAp-r14      OPTIONAL -- Need ON
}
CSI-RS-Config-PvAp-r14 ::=  CHOICE {
    release              NULL,
    setup                CHOICE {
        periodic         CSI-RS-Config-r10,
        aperiodic        CSI-RS-Config-Ap-r14
    }
}
```

In a third scheme, when a UE is configured with a plurality of CSI-RS resources (or resource configurations) in one CSI process, one selection parameter (between periodic and aperiodic CSI-RS resource configuration) can be introduced for each of the plurality of CSI-RS resources (or resource configurations). That is, each CSI-RS resource (or resource configuration) can be configured either as a periodic or an aperiodic CSI-RS resource.

In a fourth scheme, the selection parameter (between periodic and aperiodic CSI-RS resource configuration) can be introduced in the CSI process configuration. Therefore, if one CSI process is configured with a plurality of CSI-RS resources (or resource configurations), all or some of the CSI-RS resources (or resource configurations) associated with the CSI process share a same CSI-RS resource allocation (either periodic or aperiodic).

In a fifth scheme, when a UE is configured with two (possibly different) eMIMO-Type setups in one CSI process where each eMIMO-Type setup is associated with one or more CSI-RS resources (or resource configurations), one selection parameter (between periodic and aperiodic CSI-RS resource configuration) can be introduced for each of the two eMIMO-Type setups. Therefore, if one of the eMIMO-Type setups is configured with a plurality of CSI-RS resources (or resource configurations), all or some of the CSI-RS resources (or resource configurations) associated with the eMIMO-Type setup share a same CSI-RS resource allocation (either periodic or aperiodic).

In a sixth scheme, a parameter which indicates whether the CSI-RS resource is periodic or aperiodic (or whether aperiodic is ON) can be added inside the (higher-layer) configuration for aperiodic CSI reporting. This can be described in the example ASN.1 setup in TABLE 4-D. The parameter CSI-RS-Alloc-r14 configures the UE to measure either periodic or aperiodic CSI-RS for the configured A-CSI reporting.

TABLE 4-D

```
CQI-ReportAperiodic-r10   ::=   CHOICE {
    release                     NULL,
    setup                       SEQUENCE {
        CSI-RS-Alloc-r14            ENUMERATED {periodic, aperiodic}
    OPTIONAL     -- Need OR
        cqi-ReportModeAperiodic-r10     CQI-ReportModeAperiodic,
        aperiodicCSI-Trigger-r10        SEQUENCE {
            trigger1-r10                BIT STRING (SIZE (8)),
            trigger2-r10                BIT STRING (SIZE (8))
        }                                       OPTIONAL -- Need OR
    }
}
```

In a third embodiment (embodiment 1.C), CSI-RS resource configuration or reconfiguration can include a combination between semi-static CSI-RS resource configuration, activation/deactivation CSI-RS resource configuration, and dynamic CSI-RS resource selection. This embodiment is illustrated in diagram 800 of FIG. 8A. In this embodiment, an initial (first-step) CSI-RS resource configuration is performed in step 810 where a UE is configured with an aperiodic CSI-RS resource via higher-layer (RRC) signaling. In this initial resource configuration, a set of K NZP CSI-RS resources is defined or configured for the UE. This set of resources can be described by setting at least one CSI-RS resource parameter to a certain value (while not setting value for other CSI-RS resource parameters). Alternatively, the set of resources can be described by listing K combinations of values of a plurality of CSI-RS resource parameters.

A second-step CSI-RS resource configuration is performed in step 820 where a UE is configured with an aperiodic CSI-RS resource via activation/deactivation (activation/release) procedure using MAC control element (CE) signaling or UL-related DCIs (UL grants) or DL-related DCIs (DL grants)—as detailed above. In this initial resource configuration, a set of $K_A < K$ NZP CSI-RS resources is defined or configured for the UE. This set of resources (or resource configurations) can be described by setting at least one CSI-RS resource parameter to a certain value (which are not set in the first step, while not setting value for other remaining CSI-RS resource parameters). Alternatively, the set of resources can be described by listing $K_A$ combinations of values of a plurality of CSI-RS resource parameters taken from a size-$K_A$ subset of K resources defined or given in the first step.

Figure 8A:
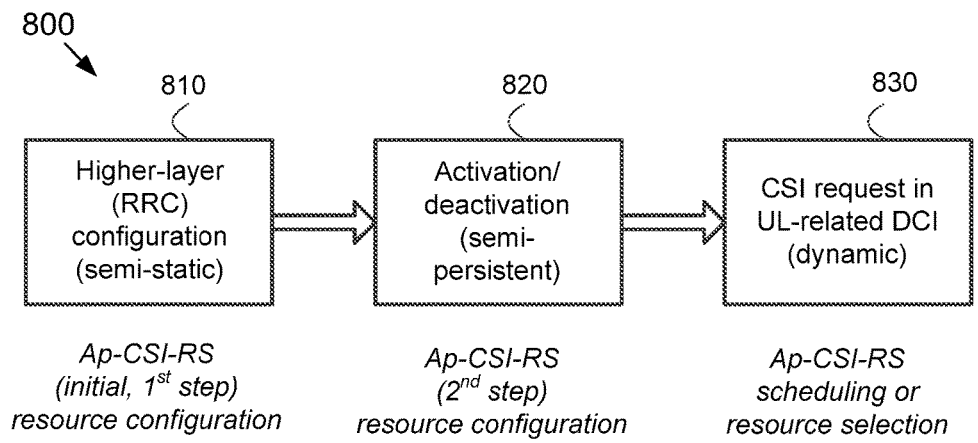
FIG. 8A illustrates an example of two-step aperiodic CSI-RS resource configuration followed by resource selection according to various embodiments of the present disclosure.
Figure 8B:
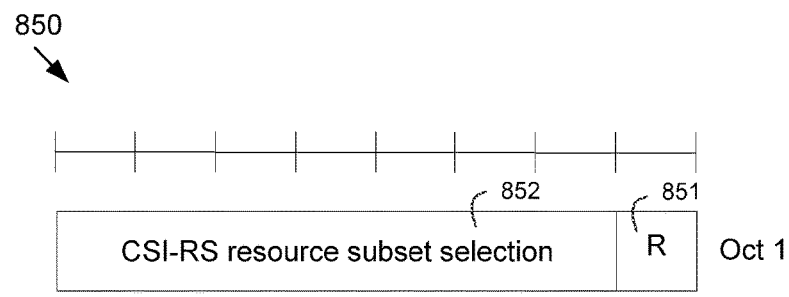
FIG. 8B illustrates an example format of MAC CE associated with the second step of aperiodic CSI-RS resource configuration according to various embodiments of the present disclosure.
Figure 8C:
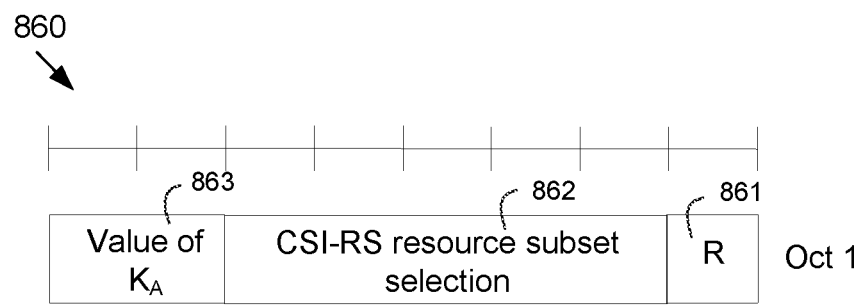
FIG. 8C illustrates another example format of MAC CE associated with the second step of aperiodic CSI-RS resource configuration according to various embodiments of the present disclosure.

Diagram 850 FIG. 8B depicts an example of MAC CE signaling where a size-$K_A$ subset of K CSI-RS resources is selected and activated for a UE. Therefore, the number of used or required hypotheses or code points is $$\binom{K}{K_A}$$

which can be signaled with $$\left\lceil \log_2 \binom{K}{K_A} \right\rceil - \text{bit}$$

codeword. In this example, for illustrative purposes, K and $K_A$ are set to be 8 and 4, respectively, which result in a 7-bit codeword (852)—appended with 1 reserved bit (851) to form an octet. In another example where K and $K_A$ are set to be 8 and 2, respectively, which result in a 5-bit codeword and a 3 reserved bits. In general, the number of bits for the CSI-RS resource subset selection field can be fixed to the worst-case (maximum) value or can be made dependent on either K, $K_A$, or both K and $K_A$.

The value of K can be configured via higher-layer signaling within a CSI-RS resource configuration. For example, this CSI-RS resource configuration can be an aperiodic CSI-RS resource configuration associated with CLASS B eMIMO-Type. Each of these K NZP CSI-RS resources is associated with a set of CSI-RS resource parameters such as T-F (time-frequency) pattern (5-bit resourceConfig in REF5, CSI Reference Signal Configuration in REF1), number of ports $N_{PORT} \in \{1,2,4,8\}$ (antennaPortsCount in REF5), pC, and/or other parameters. Each of these K NZP CSI-RS resources is not associated with any subframe configuration parameters (such as periodicity and subframe offset).

The value of $K_A$ can be fixed. For example, the value can be fixed to 4 or 2.

The value of $K_A$ can also be made configurable. An example is that $K_A$ can take value from the set $\{1, 2, \ldots, \min(K, K_{A,MAX})\}$ where $K_{A,MAX}$ can either be fixed (to, e.g. 4 or 2) or made dependent on UE capability. Another example is that $K_A = K$ when $K \leq 2$; and $K_A$ can take value from the set $\{1, 2, \ldots, \min(K, K_{A,MAX})\}$ where $K_{A,MAX}$ can either be fixed (to, e.g. 4 or 2) or made dependent on UE capability when K>2.

When K=1 or $K_A$=K, this second-step is by definition skipped.

The value of $K_A$ can be configured via higher-layer signaling. For instance, an RRC parameter $K_A$ can be defined in association or as a part of an aperiodic CSI-RS resource configuration. Alternatively, $K_A$ can be defined in association or as a part of the (CLASS B) eMIMO-Type information element. Alternatively, $K_A$ can be defined in association or as a part of the aperiodic CSI reporting configuration.

Alternatively, instead of signaling $K_A$ via higher-layer (RRC) signaling, $K_A$ can be signaled via MAC CE. This can be done in at least two manners. First, the value of $K_A$ is explicitly signaled together with CSI-RS resource subset selection as depicted in diagram 860 of FIG. 8C. In this example, CSI-RS resource subset selection field (862) is signaled together with the value of $K_A$ (863). One reserved bit is added (861) for illustrative purposes. If the total number of bits for 862 and 863 exceeds 8, two octets can be used. In general, the number of bits for the CSI-RS resource subset selection field can be fixed to the worst-case (maximum) value or can be made dependent on the value of K.

Figure 8D:
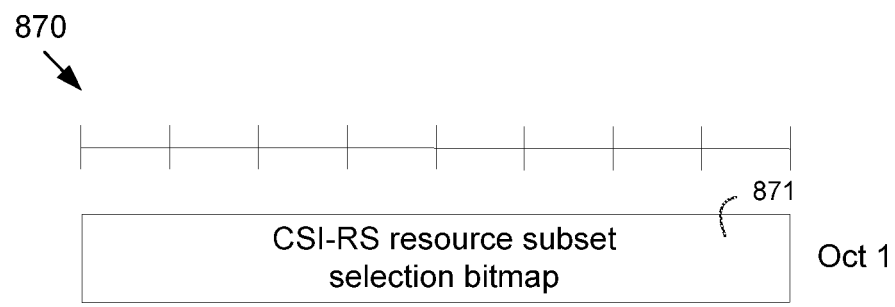
FIG. 8D illustrates another example format of MAC CE associated with the second step of aperiodic CSI-RS resource configuration according to various embodiments of the present disclosure.

Another variation of this embodiment is illustrated in diagram 870 of FIG. 8D where a length-K bitmap $B_{K-1} B_{K-2} \ldots B_1 B_0$ is used. In this illustrative embodiment, the value of K is 8. If K is less than 8, (8−K) reserved bits can be appended. Here, the k-th bit denotes whether the k-th CSI-RS resource (out of the K higher-layer-configured CSI-RS resources) is activated or dormant. In particular, when $B_k$=0, the k-th CSI-RS resource is dormant (not activated). When $B_k$=1, the k-th CSI-RS resource is activated. In this case, the number of $B_k$ whose value(s) are 1 is equal to $K_A$. Therefore, the value of $K_A$ is implicitly signaled in the bitmap 871 and variable (configurable via MAC CE). An example is that $K_A$ (the number of $B_k$ whose value(s) are 1) can take value from the set $\{1, 2, \ldots, \min(K, K_{A,MAX})\}$ where $K_{A,MAX}$ can either be fixed (to, e.g. 4 or 2) or made dependent on UE capability. Another example is that $K_A$=K when K≤2; and $K_A$ (the number of $B_k$ whose value(s) are 1) can take value from the set $\{1, 2, \ldots, \min(K, K_{A,MAX})\}$ where $K_{A,MAX}$ can either be fixed (to, e.g. 4 or 2) or made dependent on UE capability when K>2.

If UL-related DCIs (UL grants) or DL-related DCIs (DL grants) are used for activation/release, the mechanism can be described as follows. First, a UE receives a dynamic trigger/release UL or DL grant indicating a selection/activation size-$K_A$ subset of K NZP CSI-RS resources. This selection corresponds to a $$\left\lceil \log_2 \binom{K}{K_A} \right\rceil - \text{bit}$$

DCI field. Alternatively, at least one of these $$\binom{K}{K_A}$$

code points (hypotheses) can be signaled using some available (unused) or reserved code points in the DCI, while other code points (hypotheses) can be signaled using at least one additional bit in the DCI. This subset selection indicates that the associated size—$K_A$ subset of K NZP CSI-RS resources are activated and the UE shall measure or monitor (be ready to measure) these NZP CSI-RS resources. In this embodiment, each NZP CSI-RS resource can be either periodic or aperiodic CSI-RS resource. Second, for an activation trigger received in subframe n, the transmission of the associated NZP CSI-RS resource will start no earlier than subframe n+Y1 where Y1>0. For a release (deactivation) trigger received in subframe n, the transmission of the associated NZP CSI-RS resource will stop after subframe n+Y1 where Y1>0. If an UL grant or UL grant-like mechanism is used to trigger CSI-RS which is placed or transmitted in a same subframe as the UL grant, the value of Y1 or Y2 can be aligned with that of A-CSI. The same holds if a DL grant is used instead.

To perform activation and release, either the MAC-CE-based or the UL/DL-grant-based mechanism (as described above), at least the following procedures are possible. The interpretation of the currently received value of 'Activation Subset' (indication of size-$K_A$ subset of K NZP CSI-RS resources) can either depend on the most recent previously received one or independent of the most recent previously received one.

In a first procedure (P-1), if a UE receives a CSI-RS MAC CE indicating the 'Activation Subset'=x, or a UL/DL activation/release grant whose DCI includes the 'Activation Subset' (indication of size-$K_A$ subset of K NZP CSI-RS resources)=x, this can be interpreted as follows. If the most recent previously received CSI-RS MAC CE or the DCI of the most recent previously received UL/DL activation/release grant includes the 'Activation Subset'=x (the same as the currently received one), the corresponding size-$K_A$ subset of K NZP CSI-RS resources activated by the previous activation/release event are released. If the most recent previously received CSI-RS MAC CE or the DCI of the most recent previously received UL/DL activation/release grant includes the 'Activation Subset'=y≠x (different from the currently received one), the size-$K_A$ subset of K NZP CSI-RS resources corresponding to 'Activation Subset'=x are activated (and, consequently, the size-$K_A$ subset of K NZP CSI-RS resources corresponding to 'Activation Subset'=y are also still activated). If there is no previously received CSI-RS MAC CE or UL/DL activation/release grant, the corresponding size-$K_A$ subset of K NZP CSI-RS resources are activated.

In a second procedure (P-2), if a UE receives a CSI-RS MAC CE indicating the 'Activation Subset'=x, or a UL/DL activation/release grant whose DCI includes the 'Activation Subset' (indication of size-$K_A$ subset of K NZP CSI-RS resources)=x, this can be interpreted as follows. If the most recent previously received CSI-RS MAC CE or the DCI of the most recent previously received UL/DL activation/release grant includes the 'Activation Subset'=x (the same as the currently received one), the size-$K_A$ subset of K NZP CSI-RS resources corresponding to 'Activation Subset'=x are still activated/active. If the most recent previously received CSI-RS MAC CE or the DCI of the most recent previously received UL/DL activation/release grant includes the 'Activation Subset'=y≠x (different from the currently received one), the size-$K_A$ subset of K NZP CSI-RS resources corresponding to 'Activation Subset'=x are activated (and, consequently, the size-$K_A$ subset of K NZP CSI-RS resources corresponding to 'Activation Subset'=y are released). If there is no previously received CSI-RS MAC CE or UL/DL activation/release grant, the corresponding size-$K_A$ subset of K NZP CSI-RS resources are activated.

In a third procedure (P-3), two additional code points (hypotheses) can be used to indicate either 'Activation' or 'Release'/'Deactivation'. If a UE receives a CSI-RS MAC CE indicating the 'Activation Subset'=x, or a UL/DL activation/release grant whose DCI includes the 'Activation Subset' (indication of size-$K_A$ subset of K NZP CSI-RS resources)=x, this can be interpreted as follows. If 'Activation' is indicated, the size-$K_A$ subset of K NZP CSI-RS resources corresponding to 'Activation Subset'=x are activated. If 'Release' or 'Deactivation' is indicated, the size-$K_A$ subset of K NZP CSI-RS resources corresponding to 'Activation Subset'=x are released.

In the first and the third procedures (P-1 and P-3), once a size-$K_A$ subset of K NZP CSI-RS resources is activated, the size-$K_A$ subset of K NZP CSI-RS resources will remain activated until a release/deactivation (either via two consecutive identical values of size-$K_A$ subset of K NZP CSI-RS resources) associated with the same size-$K_A$ subset of K NZP CSI-RS resources is received. In the second procedure (P-2), once a size-$K_A$ subset of K NZP CSI-RS resources is activated, the size-$K_A$ subset of K NZP CSI-RS resources will remain activated until another activation message including a size-$K_A$ subset of K NZP CSI-RS resources different from the previous one is received. In all or some of the three procedures (P-1, P-2, and P-3), more than one size-$K_A$ subset of K NZP CSI-RS resources can be activated within a given subframe. In the second procedure (P-2), it is possible for a UE not to have any size-$K_A$ subset of K NZP CSI-RS resources activated in a given subframe. In the first and third procedures (P-1 and P-3), at least one size-$K_A$ subset of K NZP CSI-RS resources activated in a given subframe.

Figure 9:
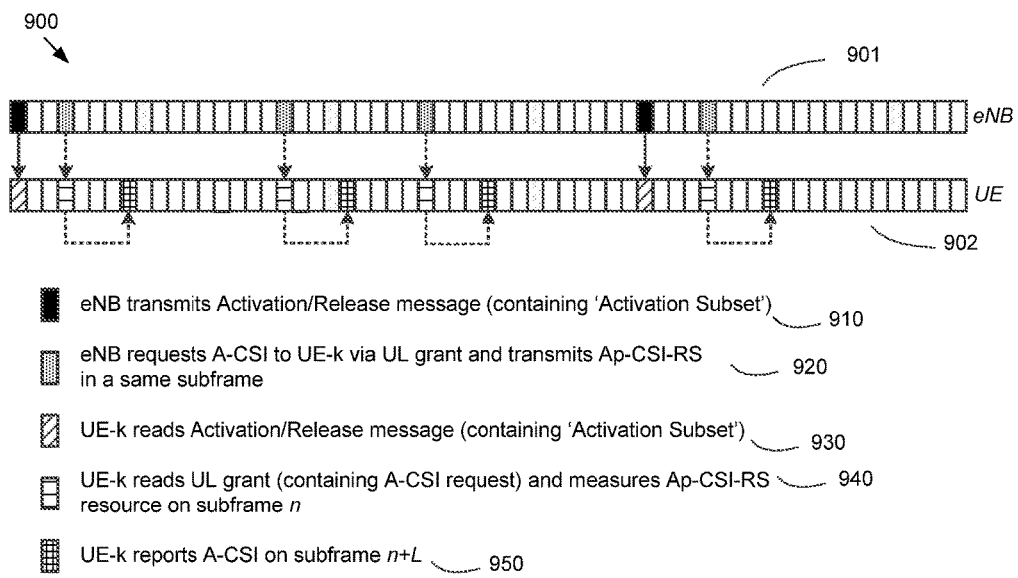
FIG. 9 illustrates an example operation using activation/release mechanism for the second step of aperiodic CSI-RS resource configuration according to various embodiments of the present disclosure.

Diagram 900 of FIG. 9 illustrates an example eNB and UE operations (in terms of timing diagram associated with eNB in 901 and UE in 902) which applies to either the MAC-CE-based or the UL/DL-grant-based mechanism. In this embodiment, an activation/release message containing 'Activation Subset' 910 is received by a UE. This configuration information can be accompanied with an A-CSI request/trigger or signaled by itself. Upon receiving a DL subframe from 910, a served UE-k reads the activation/release message in 930. Based on this information, the eNB requests A-CSI to UE-k via an UL grant (containing A-CSI trigger) while transmitting Ap-CSI-RS within the same subframe(s) 920. Upon receiving a DL subframe from 940—containing an A-CSI request/trigger—UE-k measures the transmitted Ap-CSI-RS (in subframe n) according to the resource configuration information received in subframe(s) 930, and performs CSI calculation. The resulting A-CSI is reported to the eNB in subframe(s) 950.

For each of the above embodiments for selecting/activating a size-$K_A$ subset of K NZP CSI-RS resources using MAC CE, when a UE is configured with a plurality of CSI processes or component carriers, one CSI-RS resource activation/release can be associated with one CSI process or component carrier. Alternatively, one CSI-RS resource activation/release can be associated with a plurality of CSI processes or component carriers. Alternatively, one CSI-RS resource activation/release can be associated with all the CSI processes or component carriers.

In a third step illustrated in component 830 of FIG. 8A, a UE is assigned one Ap-CSI-RS transmission wherein the CSI-RS resource configuration is selected from $K_A$ configurations given in the second step. This selected resource (or resource configuration) can be described by setting at least one CSI-RS resource parameter to a certain value (which are not set in the first and second steps). Alternatively, the selected resource can be described by indicating one combination of values of a plurality of CSI-RS resource parameters taken from a size-$K_A$ combination of values of a plurality of CSI-RS resource parameters defined or given in the second step. This selection is signaled via the UL-related DCI (included in the UL grant) used for CSI request (A-CSI triggering)—either via PDCCH or EPDCCH.

The following examples can be constructed assuming that the number of CSI-RS ports $N_{PORT}$ is configured semi-statically (the first step, via higher-layer signaling) while a set of time-frequency patterns (known as "CSI reference signal configuration" in REF1) can be configured using activation/deactivation procedure (the second step). The set of port indices is not configurable. That is, for an $N_{PORT}$ port CSI-RS, the set of port indices is always $\{15, 16, \ldots, 14 \pm N_{PORT}\}$.

In a first example, the number of CSI-RS ports $N_{PORT}$ is included as an RRC parameter (such as 'antennaPorts-Count') in the RRC configuration IE 'CSI-RS-Config' along with other CSI-RS parameters (such as pC) except for the time-frequency pattern 'resourceConfig'. For aperiodic CSI-RS, subframe configuration is not present. In the second step, a set of $K_A$ values of 'resourceConfig', where $K_A=2$, is configured via activation/deactivation mechanism. That is, 2 out of 32 possible values of 'resourceConfig' are selected for the UE in the second-step CSI-RS resource configuration. For this purpose, a 10-bit (5 bits per value) field is needed to signal the selection, either in a MAC CE (cf. example in FIG. 7A, where the MAC CE includes 'resourceConfig') or a DCI used for activation/deactivation. In the third step, one additional bit (per CSI process or "cell", or for one CSI process or "cell") is used in addition to the CSI request field in order to select one out of $K_A=2$ values of 'resourceConfig' defined in the second step resource configuration. In general, for a given value of $K_A$, $\lceil \log_2 K_A \rceil$ bits (per CSI process or "cell"; or for one CSI process or "cell") can be added for selecting one out of $K_A$ values. Alternatively, instead of adding $\lceil \log_2 K_A \rceil$ bits for selecting one out of $K_A$ values, some existing code points in the UL-related DCI can be reused for this purpose thereby reducing the number of or removing the need for additional bits.

In a second example, the number of CSI-RS ports $N_{PORT}$ is included as an RRC parameter (such as 'antennaPorts-Count') in the RRC configuration IE 'CSI-RS-Config' along with other CSI-RS parameters (such as pC). In addition, a set of K values of the time-frequency pattern 'resourceConfig', where K=8, is also included in the RRC configuration IE 'CSI-RS-Config'. For aperiodic CSI-RS, subframe configuration is not present. In the second step, a set of $K_A$ values of 'resourceConfig', where $K_A=2$, is configured via activation/deactivation mechanism. That is, 2 out of 8 possible values of 'resourceConfig' are selected for the UE in the second-step CSI-RS resource configuration. For this purpose, a 6-bit (3 bits per value) field is needed to signal the selection, either in a MAC CE (cf. example in FIG. 7A, where the MAC CE includes 'resourceConfig') or a DCI used for activation/deactivation. In the third step, one additional bit (per CSI process or "cell") is used in addition to the CSI request field in order to select one out of $K_A=2$ values of 'resourceConfig' defined in the second step resource configuration. In general, for a given value of $K_A$, $\lceil \log_2 K_A \rceil$ bits (per CSI process or "cell"; or for one CSI process or "cell") can be added for selecting one out of $K_A$ values. Alternatively, instead of adding $\lceil \log_2 K_A \rceil$ bits for selecting one out of $K_A$ values, some existing code points in the UL-related DCI can be reused for this purpose thereby reducing the number of or removing the need for additional bits.

In a third example (also applicable to the previous two examples), given a size-$K_A$ subset of NZP CSI-RS resources currently activated for the UE (from the previous step), a $\lceil \log_2 (K_A) \rceil$-bit CSI-RS resource selection field to select one out of $K_A$ activated resources can be introduced in an UL-related DCI. Alternatively, at least one of the used or required $K_A$ code points for signaling this selection can reuse code point(s) (either reserved code points or borrowed from other unused feature(s)) from the existing code point(s) in the DCI. If there are $K_A$ available code points, no additional bit needs to be introduced. Otherwise, the number of additional bits for CSI-RS resource selection can be reduced.

The fourth component (that is, aperiodic CSI-RS CSI reference resource) regulates the manner in which a UE measures aperiodic CSI-RS. As described in FIGS. 5 and 6 (640 and 650), a UE performs aperiodic CSI reporting in subframe n=m+L upon decoding in subframe n either an uplink DCI format, or a Random Access Response Grant containing a CSI request field which is set to trigger a CSI report. It is further described that a CSI-RS (in this case, aperiodic CSI-RS) is transmitted within the same subframe containing the trigger (the CSI request field in either the associated uplink DCI format or a Random Access Response Grant) for the CSI report. In other words, the aperiodic CSI reporting performed in subframe m is a response of a CSI request field in subframe n−L. To calculate this CSI, CSI-RS located within a same subframe no later than the associated CSI reference resource (defined by a single downlink or special subframe $n-n_{CQI\_ref}$) is used. This CSI reference resource is located on or after the subframe containing the trigger (the CSI request field in either the associated uplink DCI format or a Random Access Response Grant) for the CSI report.

In particular, the following description for aperiodic CSI calculation in relation to CSI reference resource for some scenarios is given as follows (from REF3 section 7.2.3).

For a UE in transmission mode 9 or 10 and for a CSI process, if the UE is configured with parameter eMIMO-Type by higher layers, and eMIMO-Type is set to 'CLASS A', and one CSI-RS resource configured, or the UE is configured with parameter eMIMO-Type by higher layers, and eMIMO-Type is set to 'CLASS B', and parameter channelMeasRestriction is not configured by higher layers, the UE shall derive the channel measurements for computing the CQI value reported in uplink subframe n and corresponding to the CSI process, based on only the non-zero power CSI-RS (defined in [3]) within a configured CSI-RS resource associated with the CSI process.

For a UE in transmission mode 9 or 10 and for a CSI process, if the UE is configured with parameter eMIMO-Type by higher layers, and eMIMO-Type is set to 'CLASS B', and parameter channelMeasRestriction is configured by higher layers, the UE shall derive the channel measurements for computing the CQI value reported in uplink subframe n and corresponding to the CSI process, based on only the most recent, no later than the CSI reference resource, non-zero power CSI-RS (defined in [3]) within a configured CSI-RS resource associated with the CSI process.

The CSI reference resource for a serving cell is defined as follows:

For a non-BL/CE UE, in the frequency domain, the CSI reference resource is defined by the group of downlink physical resource blocks corresponding to the band to which the derived CQI value relates. For a BL/CE UE, in the frequency domain, the CSI reference resource includes all downlink physical resource blocks for any of the narrowband to which the derived CQI value relates.

In the time domain and for a non-BL/CE UE,
for a UE configured in transmission mode 1-9 or transmission mode 10 with a single configured CSI process for the serving cell, the CSI reference resource is defined by a single downlink or special subframe $n-n_{CQI\_ref}$,
where for aperiodic CSI reporting, if the UE is not configured with the higher layer parameter csi-SubframePatternConfig-r12, $n_{CQI\_ref}$ is such that the reference resource is in the same valid downlink or valid special subframe as the corresponding CSI request in an uplink DCI format.

$n_{CQI\_ref}$ is equal to 4 and subframe $n-n_{CQI\_ref}$ corresponds to a valid downlink or valid special subframe, where subframe $n-n_{CQI\_ref}$ is received after the subframe with the corresponding CSI request in a Random Access Response Grant.

where for aperiodic CSI reporting, and the UE configured with the higher layer parameter csi-SubframePatternConfig-r12, for the UE configured in transmission mode 1-9, $n_{CQI\_ref}$ is the smallest value greater than or equal to 4 and subframe $n-n_{CQI\_ref}$ corresponds to a valid downlink or valid special subframe, where subframe $n-n_{CQI\_ref}$ is received on or after the subframe with the corresponding CSI request in an uplink DCI format;

$n_{CQI\_ref}$ is the smallest value greater than or equal to 4, and subframe $n-n_{CQI\_ref}$ corresponds to a valid downlink or valid special subframe, where subframe $n-n_{CQI\_ref}$ is received after the subframe with the corresponding CSI request in an Random Access Response Grant;

if there is no valid value for $n_{CQI\_ref}$ based on the above conditions, then $n_{CQI\_ref}$ is the smallest value such that the reference resource is in a valid downlink or valid special subframe $n-n_{CQI\_ref}$ prior to the subframe with the corresponding CSI request, where subframe $n-n_{CQI\_ref}$ is the lowest indexed valid downlink or valid special subframe within a radio frame;

for the UE configured in transmission mode 10, $n-n_{CQI\_ref}$ is the smallest value greater than or equal to 4, such that the value corresponds to a valid downlink or valid special subframe, and the corresponding CSI request is in an uplink DCI format;

$n_{CQI\_ref}$ is the smallest value greater than or equal to 4, and subframe $n-n_{CQI\_ref}$ corresponds to a valid downlink or valid special subframe, where subframe $n-n_{CQI\_ref}$ is received after the subframe with the corresponding CSI request in a Random Access Response Grant;

In the present disclosure, several embodiments for aperiodic CSI-RS location and CSI reference resource subframe are given below.

In one embodiment, when a UE is configured with aperiodic CSI-RS (for example, via any of the configuration embodiments discussed above), the non-zero-power CSI-RS used to calculate CSI is located in the subframe containing the trigger (the CSI request field in either the associated uplink DCI format or a Random Access Response Grant) for the CSI report. In addition, the CSI reference resource $n-n_{CQI\_ref}$ is defined by a same valid downlink or valid special subframe as the corresponding CSI request in an uplink DCI format. In this embodiment, $n-n_{CQI\_ref}$ is chosen to be the same as that for the legacy periodic CSI-RS. For a UE configured in transmission mode 1-9 or transmission mode 10 with a single configured CSI process for the serving cell, three possibilities exist. First, $n_{CQI\_ref}$ is equal to 4. Second, $n_{CQI\_ref}$ is the smallest value greater than or equal to 4, such that the value corresponds to a valid downlink or valid special subframe, and the corresponding CSI request is in an uplink DCI format. Third, $n_{CQI\_ref}$ is the smallest value greater than or equal to $n-n_{CQI\_ref}$ corresponds to a valid downlink or valid special subframe, where subframe $n-n_{CQI\_ref}$ is received after the subframe with the corresponding CSI request in a Random Access Response Grant.

In another embodiment, when a UE is configured with aperiodic CSI-RS (for example, via any of the configuration embodiments discussed above), the non-zero-power CSI-RS used to calculate CSI is located in the subframe containing the trigger (the CSI request field in either the associated uplink DCI format or a Random Access Response Grant) for the CSI report. In addition, the CSI reference resource $n-n_{CQI\_ref}$ is defined by a same valid downlink or valid special subframe as the corresponding CSI request in an uplink DCI format. In this embodiment, $n_{CQI\_ref}$ is chosen to be different from that for the legacy periodic CSI-RS. An additional X-subframe time is added to the UE processing time when a UE is configured with aperiodic CSI-RS. For instance X=1 can be chosen. In this case, for a UE configured in transmission mode 1-9 or transmission mode 10 (for LTE) with a single configured CSI process for the serving cell, three possibilities exist. First, $n_{CQI\_ref}$ is equal to 5. Second, $n_{CQI\_ref}$ is the smallest value greater than or equal to 5, such that the value corresponds to a valid downlink or valid special subframe, and the corresponding CSI request is in an uplink DCI format. Third, $n_{CQI\_ref}$ is the smallest value greater than or equal to 5, and subframe $n-n_{CQI\_ref}$ corresponds to a valid downlink or valid special subframe, where subframe $n-n_{CQI\_ref}$ is received after the subframe with the corresponding CSI request in a Random Access Response Grant.

In a variation of this embodiment, the value of X (a subframe offset for $n_{CQI\_ref}$ from 4) is not fixed and can be configured via higher-layer (RRC) signaling for a given UE. For example, an RRC parameter SubframeOffsetApCSIRS can be used to configure the value of X from {0, 1, or 2}. Alternatively, the value of X can be made a UE capability.

Figure 10:
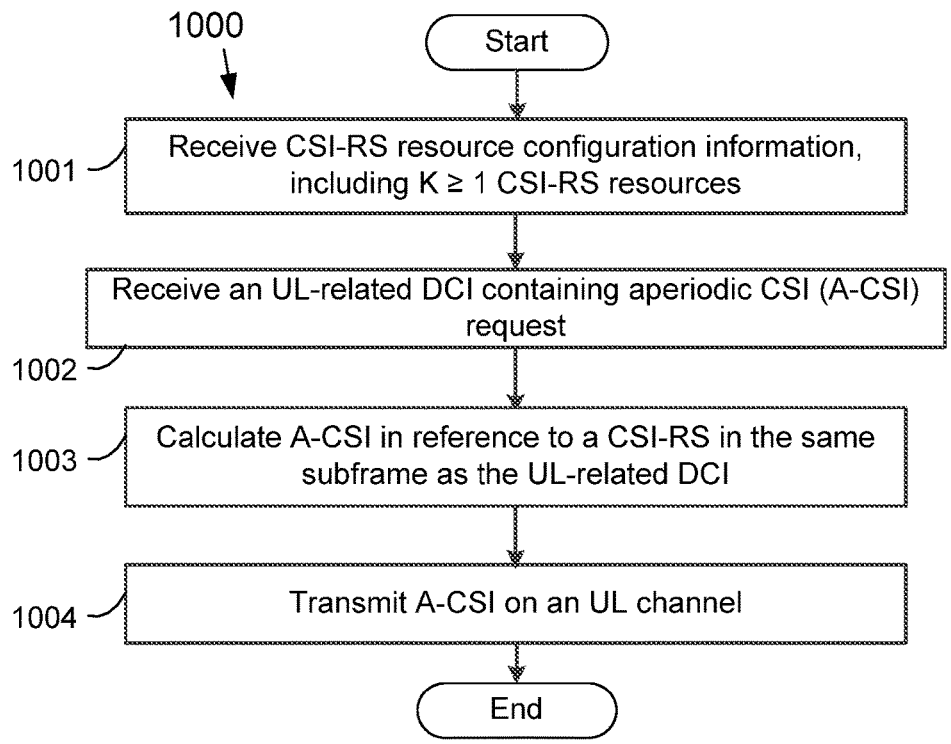
FIG. 10 illustrates a flowchart for an example method wherein a UE receives CSI-RS resource configuration information according to an embodiment of the present disclosure.

FIG. 10 illustrates a flowchart for an example method 1000 wherein a UE receives CSI-RS resource configuration information according to an embodiment of the present disclosure. For example, the method 1000 can be performed by the UE 116.

The method 1000 begins with the UE receiving CSI-RS resource configuration information which includes K≥1 CSI-RS resources (step 1001). This configuration information can be sent to the UE via higher-layer (such as RRC) signaling. Since this CSI-RS resource configuration corresponds to aperiodic CSI-RS, subframe configuration (which includes periodicity and subframe offset) can be absent from this configuration. In addition, this configuration information can correspond to CLASS B eMIMO-Type. In a subframe, the UE receives an UL-related DCI containing an aperiodic CSI (A-CSI) request (step 1002) along with a CSI-RS associated with a selected CSI-RS resource. In reference to the CSI-RS, the UE calculates A-CSI (step 1003) and transmits the A-CSI on an UL channel (step 1004).

The selected CSI-RS resource is taken from the K CSI-RS resources assigned to the UE. When K=1, the selected CSI-RS resource is the same as the resource included in the CSI-RS resource configuration information. When K>1, the selection of one CSI-RS resource can be done in one or two steps. In the one-step selection, the UL-related DCI includes an indication of which one of the K CSI-RS resources is selected. On the two-step selection, N (<K) CSI-RS resources are first selected by activating N out of K configured resources. This is then followed by an indication (in the UL-related DCI) of which one of the N CSI-RS resources is selected. The activation of N out of K configured resources can be signaled via either MAC CE or L1 downlink control signaling.

Figure 11:
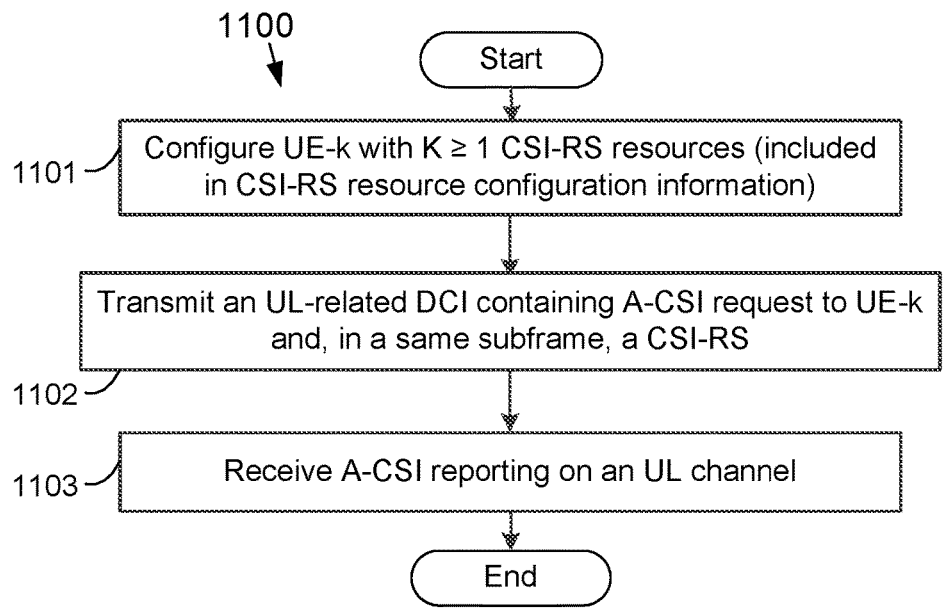
FIG. 11 illustrates a flowchart for an example method wherein a BS configures a UE with CSI-RS resource according to various embodiments of the present disclosure.

FIG. 11 illustrates a flowchart for an example method wherein a BS configures a UE (labeled as UE-k) with CSI-RS resource. For example, the method 1100 can be performed by the eNB 102.

The method 1100 begins with the BS configuring UE-k with K≥1 CSI-RS resources (step 1101). This information is included in CSI-RS resource configuration information. This configuration information can be sent to the UE via higher-layer (such as RRC) signaling. Since this CSI-RS resource configuration corresponds to aperiodic CSI-RS, subframe configuration (which includes periodicity and subframe offset) can be absent from this configuration. In addition, this configuration information can correspond to CLASS B eMIMO-Type. In a subframe, the BS transmits an UL-related DCI containing aperiodic CSI (A-CSI) request to UE-k along with a CSI-RS which is associated with a selected CSI-RS resource (step 1102). After a few subframes, the BS receives the requested A-CSI reporting on an UL channel from UE-k (step 1103).

The selected CSI-RS resource is taken from the K CSI-RS resources assigned to UE-k. When K=1, the selected CSI-RS resource is the same as the resource included in the CSI-RS resource configuration information. When K>1, the selection of one CSI-RS resource can be done in one or two steps. In the one-step selection, the UL-related DCI includes an indication of which one of the K CSI-RS resources is selected. On the two-step selection, N (<K) CSI-RS resources are first selected by activating N out of K configured resources. This is then followed by an indication (in the UL-related DCI) of which one of the N CSI-RS resources is selected. The activation of N out of K configured resources can be signaled via either MAC CE or L1 downlink control signaling.

Although FIGS. 10 and 11 illustrate examples of methods for receiving configuration information and configuring a UE, respectively, various changes could be made to FIGS. 10 and 11. For example, while shown as a series of steps, various steps in each figure could overlap, occur in parallel, occur in a different order, occur multiple times, or not be performed in one or more embodiments.

Although the present disclosure has been described with example embodiments, various changes and modifications can be suggested by or to one skilled in the art. It is intended that the present disclosure encompass such changes and modifications as fall within the scope of the appended claims.

What is claimed:

1. A user equipment (UE) comprising:
a transceiver configured to receive information indicating a channel state information reference signal (CSI-RS) resource configuration, an activation message for a CSI-RS, and the CSI-RS that is associated with a selected CSI-RS resource; and
a processor operably connected to the transceiver, the processor configured to calculate CSI in reference to the CSI-RS,
wherein the transceiver is further configured to report the CSI by transmitting the CSI on an uplink channel,
wherein the activation message indicates a starting transmission time interval of the CSI-RS,
wherein the information indicating the CSI-RS resource configuration is received via higher-layer signaling, and
wherein the CSI-RS resource configuration includes a periodicity and an offset.

2. The UE of claim 1, wherein the activation message is received via a medium access control (MAC) control element (CE).

3. The UE of claim 2, wherein a deactivation message indicating an ending transmission time interval of the CSI-RS is received via the MAC CE.

4. The UE of claim 1, wherein the activation message is included in downlink control information (DCI) and received via a physical downlink control channel (PDCCH).

5. The UE of claim 4, wherein a deactivation message indicating an ending transmission time interval of the CSI-RS is included in the DCI and received via the PDCCH.

6. A base station (BS) comprising:
a processor configured to generate information indicating a channel state information reference signal (CSI-RS) resource configuration and an activation message for a CSI-RS; and
a transceiver operably connected to the processor, the transceiver configured to:
transmit the information indicating the CSI-RS resource configuration, the activation message for the CSI-RS, and the CSI-RS that is associated with a selected CSI-RS resource, and
receive CSI calculated in reference to the CSI-RS reported on an uplink channel,
wherein the activation message indicates a starting transmission time interval of the CSI-RS,
wherein the information indicating the CSI-RS resource configuration is transmitted via higher-layer signaling, and
wherein the CSI-RS resource configuration includes a periodicity and an offset.

7. The BS of claim 6, wherein the activation message is transmitted via a medium access control (MAC) control element (CE).

8. The BS of claim 7, wherein a deactivation message indicating an ending transmission time interval of the CSI-RS is transmitted via the MAC CE.

9. The BS of claim 6, wherein the activation message is included in downlink control information (DCI) and transmitted via a physical downlink control channel (PDCCH).

10. The BS of claim 9, wherein a deactivation message indicating an ending transmission time interval of the CSI-RS is included in the DCI and transmitted via the PDCCH.

11. A method for operating a user equipment (UE), the method comprising:
receiving information indicating a channel state information reference signal (CSI-RS) resource configuration, an activation message for a CSI-RS, and the CSI-RS that is associated with a selected CSI-RS resource;
calculating CSI in reference to the CSI-RS; and
reporting the CSI by transmitting the CSI on an uplink channel,
wherein the activation message indicates a starting transmission time interval of the CSI-RS,
wherein the information indicating the CSI-RS resource configuration is received via higher-layer signaling, and
wherein the CSI-RS resource configuration includes a periodicity and an offset.

12. The method of claim 11, wherein the activation message is received via a medium access control (MAC) control element (CE).

13. The method of claim 12, wherein a deactivation message indicating an ending transmission time interval of the CSI-RS is received via the MAC CE.

14. The method of claim 11, wherein the activation message is included in downlink control information (DCI) and received via a physical downlink control channel (PDCCH).

15. The method of claim 14, wherein a deactivation message indicating an ending transmission time interval of the CSI-RS is included in the DCI and received via the PDCCH.

* * * * *